US012171370B2

(12) United States Patent
Horne, III

(10) Patent No.: US 12,171,370 B2
(45) Date of Patent: Dec. 24, 2024

(54) FIRE PIT SYSTEMS AND METHODS OF MAKING AND USING THE SAME

(71) Applicant: KUDU SAFARI BRAAI, LLC, Springfield, MO (US)

(72) Inventor: Stebin Horne, III, Macon, GA (US)

(73) Assignee: KUDU SAFARI BRAAI, LLC, Springfield, MO (US)

( * ) Notice: Subject to any disclaimer, the term of this patent is extended or adjusted under 35 U.S.C. 154(b) by 6 days.

(21) Appl. No.: 18/048,295

(22) Filed: Oct. 20, 2022

(65) Prior Publication Data

US 2023/0069696 A1 Mar. 2, 2023

Related U.S. Application Data

(60) Continuation of application No. 16/819,882, filed on Mar. 16, 2020, now Pat. No. 11,529,016, which is a division of application No. 15/495,519, filed on Apr. 24, 2017, now Pat. No. 10,588,455.

(60) Provisional application No. 62/382,436, filed on Sep. 1, 2016, provisional application No. 62/327,496, filed on Apr. 26, 2016.

(51) Int. Cl.
*A47J 37/07* (2006.01)
(52) U.S. Cl.
CPC ....... *A47J 37/0704* (2013.01); *A47J 37/0763* (2013.01); *A47J 37/0772* (2013.01); *A47J 2037/0777* (2013.01); *A47J 2037/0795* (2013.01); *A47J 2201/00* (2013.01)

(58) Field of Classification Search
CPC ............... A47J 37/0704; A47J 37/0763; A47J 37/0777; A47J 2037/0795; A47J 2201/00; A47J 37/0772; A47J 2037/0777; A47J 37/07; F24B 1/181; F24B 1/182; F24B 1/26
USPC ..... 126/25 A, 29, 90, 9 B, 30, 9 R, 25 R, 25
See application file for complete search history.

(56) References Cited

U.S. PATENT DOCUMENTS 1,452,640 A * 4/1923 Hulick .................... A47J 33/00
126/30
1,531,517 A * 3/1925 Simmons .............. A47J 37/046
219/403
(Continued)

FOREIGN PATENT DOCUMENTS

CA 2713583 A1 * 3/2011 ............. A47J 33/00
DE 102004031921 A1 * 1/2006 .......... A47J 37/0704
(Continued)

*Primary Examiner* — Allen R. B. Schult
*Assistant Examiner* — William C Weinert
(74) *Attorney, Agent, or Firm* — Husch Blackwell LLP

(57) ABSTRACT

Fire pit systems including a base pan member having a base pan member lower wall with a pan outer periphery, and one or more side walls extending upward from the base pan member lower wall and along the pan outer periphery; at least two rod members extending upward along opposite sides of the pan outer periphery; and one or more additional accessories that are attachable to and detachable from at least one of the at least two rod members, the one or more additional accessories comprising a griddle, a grill, a coffee pot, a Dutch oven, a tubular spacer, a pot holder, a horizontal bar extending between two rod members of the at least two rod members, a warming tray, or any combination thereof. Methods of making and using the fire pit systems.

12 Claims, 22 Drawing Sheets

(56) References Cited

U.S. PATENT DOCUMENTS

| | | | | |
|---|---|---|---|---|
| 1,666,293 | A * | 4/1928 | Lorton | A47J 33/00 126/30 |
| 2,058,172 | A * | 10/1936 | Myers | A47J 37/0763 99/402 |
| 2,542,577 | A * | 2/1951 | Russell | F24C 3/085 239/587.5 |
| 2,573,988 | A * | 11/1951 | Saltzberg | F24B 1/202 99/393 |
| 2,598,502 | A * | 5/1952 | Butler | D06F 57/12 126/30 |
| 2,827,846 | A * | 3/1958 | Karkling | A47J 37/0763 126/30 |
| 2,960,979 | A * | 11/1960 | Stone | A47J 37/0772 126/30 |
| 2,977,953 | A * | 4/1961 | Dowdy | A47J 37/0763 126/30 |
| 3,091,343 | A * | 5/1963 | Neumann | F25D 25/027 211/74 |
| 3,094,113 | A * | 6/1963 | Avila | A47J 37/0763 126/30 |
| 3,498,210 | A * | 3/1970 | O'Toole | A47J 37/0763 99/450 |
| 3,559,565 | A * | 2/1971 | Getz | A47J 37/0704 99/450 |
| D257,206 | S * | 10/1980 | Vincent | D6/695.6 |
| 4,589,399 | A * | 5/1986 | Hamill | A47J 37/0763 126/30 |
| 4,607,608 | A * | 8/1986 | Allred | A47J 33/00 126/30 |
| 4,706,817 | A * | 11/1987 | Greathouse | A47J 47/14 D34/24 |
| 4,726,349 | A * | 2/1988 | Gehrke | A47J 37/0763 126/25 B |
| D382,765 | S * | 8/1997 | Kellermann | D7/332 |
| 5,758,570 | A * | 6/1998 | Hill | A47J 37/0763 99/449 |
| 5,862,742 | A * | 1/1999 | Bjerg | A47J 33/00 126/30 |
| 5,884,554 | A * | 3/1999 | Sprick | A47J 37/041 99/449 |
| 6,029,646 | A * | 2/2000 | Jackson | A47J 37/0772 126/30 |
| 6,105,569 | A * | 8/2000 | Andress | A47J 33/00 126/30 |
| 6,640,797 | B1 * | 11/2003 | Magers | F24B 1/205 126/30 |
| 7,856,924 | B1 * | 12/2010 | Stihi | A47J 37/0731 126/25 AA |
| 9,215,950 | B2 * | 12/2015 | Walker | F24B 1/205 |
| 2006/0283438 | A1 * | 12/2006 | Lu | A47J 37/0704 126/30 |
| 2009/0211563 | A1 * | 8/2009 | Blackshear | A47J 33/00 126/30 |
| 2010/0294907 | A1 * | 11/2010 | Kocher | A47J 37/07 248/413 |
| 2010/0300425 | A1 * | 12/2010 | Rees, Jr. | A47J 37/0786 126/25 R |
| 2012/0312297 | A1 * | 12/2012 | Walker | F24B 1/205 126/9 B |
| 2012/0318255 | A1 * | 12/2012 | Brown | F23B 20/00 126/25 R |
| 2013/0000629 | A1 * | 1/2013 | Christopoulos | A47J 37/0745 126/25 AA |
| 2014/0209084 | A1 * | 7/2014 | Cole | A47J 33/00 126/30 |
| 2014/0261008 | A1 * | 9/2014 | Howard, Jr. | A47J 37/0786 99/422 |
| 2014/0360483 | A1 * | 12/2014 | Mattix | A47J 33/00 126/30 |
| 2015/0305561 | A1 * | 10/2015 | Andol | A47J 37/0704 126/25 A |
| 2016/0029841 | A1 * | 2/2016 | Walker | A47J 37/0763 99/445 |
| 2016/0051087 | A1 * | 2/2016 | Nguyen | A47J 37/07 99/445 |
| 2023/0132862 | A1 * | 5/2023 | Spinney | F24B 1/193 126/25 R |

FOREIGN PATENT DOCUMENTS

| | | | | |
|---|---|---|---|---|
| DE | 202017004811 | U1 * | 10/2018 | A47J 37/0704 |
| DE | 102017115827 | A1 * | 1/2019 | A47J 37/0704 |
| EP | 212750 | A1 * | 8/1986 | A47J 37/0786 |
| FR | 2947162 | A1 * | 12/2010 | A47J 37/0704 |
| JP | 11146836 | A * | 6/1999 | A47J 37/07 |
| KR | 20170104256 | A * | 3/2016 | A47J 37/0694 |

* cited by examiner

FIRE PIT SYSTEMS AND METHODS OF MAKING AND USING THE SAME

CROSS-REFERENCE TO RELATED APPLICATIONS

This patent application is a continuation application of U.S. patent application Ser. No. 16/819,882 entitled "FIRE PIT SYSTEMS AND METHODS OF MAKING AND USING THE SAME" filed on Mar. 16, 2020, which is a divisional patent application of U.S. Utility patent application Ser. No. 15/495,519 entitled "FIRE PIT SYSTEMS AND METHODS OF MAKING AND USING THE SAME" filed on Apr. 24, 2017, now U.S. Pat. No. 10,588,455, which claims the benefit of priority to (i) U.S. provisional patent application Ser. No. 62/327,496 entitled "FIRE PIT SYSTEMS AND METHODS OF MAKING AND USING THE SAME" filed on Apr. 26, 2016, and (ii) U.S. provisional patent application Ser. No. 62/382,436 entitled "FIRE PIT SYSTEMS AND METHODS OF MAKING AND USING THE SAME" filed on Sep. 1, 2016, the subject matter of both of which is incorporated herein in its entirety.

FIELD OF THE INVENTION

The present invention is directed to fire pit systems. The present invention is further directed to methods of making and using fire pit systems.

BACKGROUND

Efforts continue to further develop fire pit systems.

SUMMARY

The present invention addresses some of the difficulties and problems discussed above by the discovery of new fire pit systems.

Accordingly, the present invention is directed to fire pit systems. In one exemplary embodiment, the fire pit systems of the present invention comprise: (I) a base pan member comprising: a base pan member lower wall having a pan outer periphery, and one or more side walls extending upward from the base pan member and along the pan outer periphery; (II) at least two rod members extending upward along opposite sides of the pan outer periphery; and (III) one or more additional accessories that are attachable to and detachable from at least one of the at least two rod members, the one or more additional accessories comprising a griddle, a grill, a coffee pot, a Dutch oven, a tubular spacer, a pot holder, a horizontal bar extending between two rod members of said at least two rod members, or any combination thereof.

In another exemplary embodiment, the fire pit systems of the present invention comprise: (I) a base pan member comprising: a base pan member lower wall having a pan outer periphery, and one or more side walls extending upward from the base pan member and along the pan outer periphery; (II) at least two rod members extending upward along opposite sides of the pan outer periphery; (III) one or more additional accessories that are attachable to and detachable from at least one of the at least two rod members, the one or more additional accessories comprising a griddle, a grill, a coffee pot, a Dutch oven, a tubular spacer, a pot holder, a horizontal bar extending between two rod members of said at least two rod members, or any combination thereof; and (IV) two or more ring members, each ring member comprising: a ring base having a ring outer periphery, at least two ring connectors along opposite sides of the ring outer periphery, and at least two ring tubular members extending substantially perpendicular to the ring base, the at least two ring tubular members being attached to the ring base via the at least two ring connectors; wherein each ring tubular member has a tubular diameter that enables the two or more ring members to be positioned and stacked along the at least two rod members.

In yet another exemplary embodiment, the fire pit systems of the present invention comprise: (I) a base pan member comprising: a base pan member lower wall having a pan outer periphery, and one or more side walls extending upward from the base pan member and along the pan outer periphery; (II) at least two rod members extending upward along opposite sides of the pan outer periphery; and at least one of: (III)(A) a griddle that is attachable to and detachable from at least one of the at least two rod members; (III)(B) a grill that is attachable to and detachable from at least one of the at least two rod members; and (III)(C) two or more ring members, each ring member comprising: a ring base having a ring outer periphery, at least two ring connectors along opposite sides of the ring outer periphery, and at least two ring tubular members extending substantially perpendicular to the ring base, the at least two ring tubular members being attached to the ring base via the at least two ring connectors; wherein each ring tubular member has a tubular diameter that enables the two or more ring members to be positioned and stacked along the at least two rod members.

The present invention further relates to kits for forming the fire pit systems of the present invention. In one exemplary embodiment, the kit comprises any combination of the fire pit system components and features described herein.

In another exemplary embodiment, the kit comprises: (I) a base pan member comprising: a base pan member lower wall having a pan outer periphery, and one or more side walls extending upward from said base pan member lower wall and along said pan outer periphery; (II) at least two rod members extending upward along opposite sides of said pan outer periphery; and one or more of: (III)(A) a griddle that is attachable to and detachable from at least one of said at least two rod members; (III)(B) a grill that is attachable to and detachable from at least one of said at least two rod members; and (III)(C) two or more ring members, each ring member comprising: a ring base having a ring outer periphery, at least two ring connectors along opposite sides of said ring outer periphery, and at least two ring tubular members extending substantially perpendicular to said ring base, said at least two ring tubular members being attached to said ring base via said at least two ring connectors; wherein each ring tubular member has a tubular diameter $d_{tm}$ that enables said two or more ring members to be positioned and stacked along said at least two rod members. Any of the herein-disclosed kits may further comprise a carrying case sized to house said kit for storage and transport.

The present invention further relates to methods of making fire pit systems. In one exemplary embodiment, the method of making a fire pit system comprises: (I) forming a base pan member comprising: a base pan member lower wall having a pan outer periphery, and one or more side walls extending upward from the base pan member and along the pan outer periphery; (II) forming at least two rod members that are attachable and detachable from the base pan member, and when assembled, extend upward along opposite sides of the pan outer periphery; and (III) forming one or more additional accessories that are attachable to and detachable from at least one of the at least two rod members, the one or more additional accessories comprising a griddle, a grill, a coffee pot, a Dutch oven, a tubular spacer, a pot holder, a horizontal bar extending between two rod members of said at least two rod members, or any combination thereof.

In another exemplary embodiment, the method of making a fire pit system comprises: (I) forming a base pan member comprising: a base pan member lower wall having a pan outer periphery, and one or more side walls extending upward from the base pan member and along the pan outer periphery; (II) forming at least two rod members that are attachable and detachable from the base pan member, and when assembled, extend upward along opposite sides of the pan outer periphery; (III) forming one or more additional accessories that are attachable to and detachable from at least one of the at least two rod members, the one or more additional accessories comprising a griddle, a grill, a coffee pot, a Dutch oven, a tubular spacer, a pot holder, a horizontal bar extending between two rod members of said at least two rod members, or any combination thereof; and (IV) forming two or more ring members, each ring member comprising: a ring base having a ring outer periphery, at least two ring connectors along opposite sides of the ring outer periphery, and at least two ring tubular members extending substantially perpendicular to the ring base, the at least two ring tubular members being attached to the ring base via the at least two ring connectors; wherein each ring tubular member has a tubular diameter that enables the two or more ring members to be positioned and stacked along the at least two rod members. Desirably, the two or more ring members are positionable and stackable along the at least two rod members so that the ring outer periphery of the two or more ring members is positioned above and within the pan outer periphery of the base pan member.

In yet another exemplary embodiment, the method of making a fire pit system comprises: (I) forming a base pan member comprising: a base pan member lower wall having a pan outer periphery, and one or more side walls extending upward from the base pan member and along the pan outer periphery; (II) forming at least two rod members that are attachable and detachable from the base pan member, and when assembled, extend upward along opposite sides of the pan outer periphery; and forming at least one of: (III)(A) a griddle that is attachable to and detachable from at least one of the at least two rod members; (III)(B) a grill that is attachable to and detachable from at least one of the at least two rod members; and (III)(C) two or more ring members, each ring member comprising: a ring base having a ring outer periphery, at least two ring connectors along opposite sides of the ring outer periphery, and at least two ring tubular members extending substantially perpendicular to the ring base, the at least two ring tubular members being attached to the ring base via the at least two ring connectors; wherein each ring tubular member has a tubular diameter $d_{tm}$ that enables the two or more ring members to be positioned and stacked along the at least two rod members; (III)(B).

The present invention even further relates to methods of using fire pit systems. In one exemplary embodiment, the method of using a fire pit system comprises: burning a combustible material (e.g., wood and/or charcoal) within the base pan member of the herein-disclosed fire pit systems. Methods of using a fire pit system of the present invention may further comprise any one or combination of the following steps: attaching the at least two rod members to the base pan member; attaching the three or more pan legs to the base pan member; positioning the two or more ring members on the at least two rod members; attaching one or more additional accessories to at least one of the at least two rod members, the one or more additional accessories comprising a griddle, a grill, a coffee pot, a Dutch oven, a tubular spacer, a pot holder, a horizontal bar extending between two rod members of said at least two rod members, or any combination thereof; cooking food above the base pan member; positioning the combustible material within the base pan member; positioning the two or more ring members along the at least two rod members so as to prevent the combustible material from falling out of the base pan member; disassembling all of the components of the fire pit system; and packaging all of the components of the fire pit system within a carrying case.

These and other features and advantages of the present invention will become apparent after a review of the following detailed description of the disclosed embodiments and the appended claims.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to fire pit systems. The present invention is further directed to methods of making fire pit systems. The present invention is even further directed to methods of using fire pit systems.

The fire pit systems of the present invention are further described in the following embodiments.

Other Embodiments

Fire Pit Systems

Figure 17:
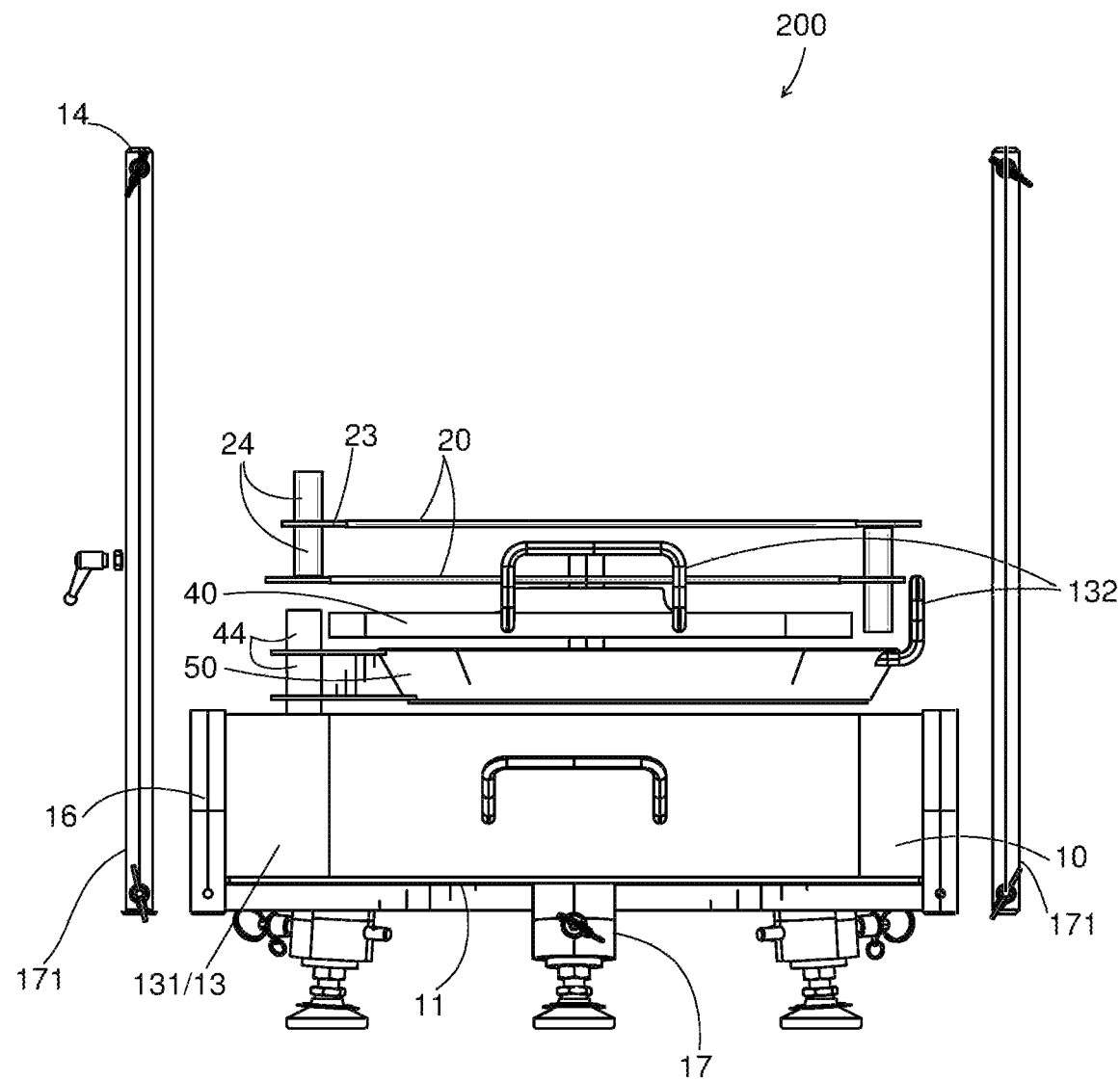
FIG. 17 is a perspective view of an exemplary kit for forming an exemplary fire pit system of the present invention, the components of the exemplary kit being dissembled and ready for storage and/or transport.
Figure 18:
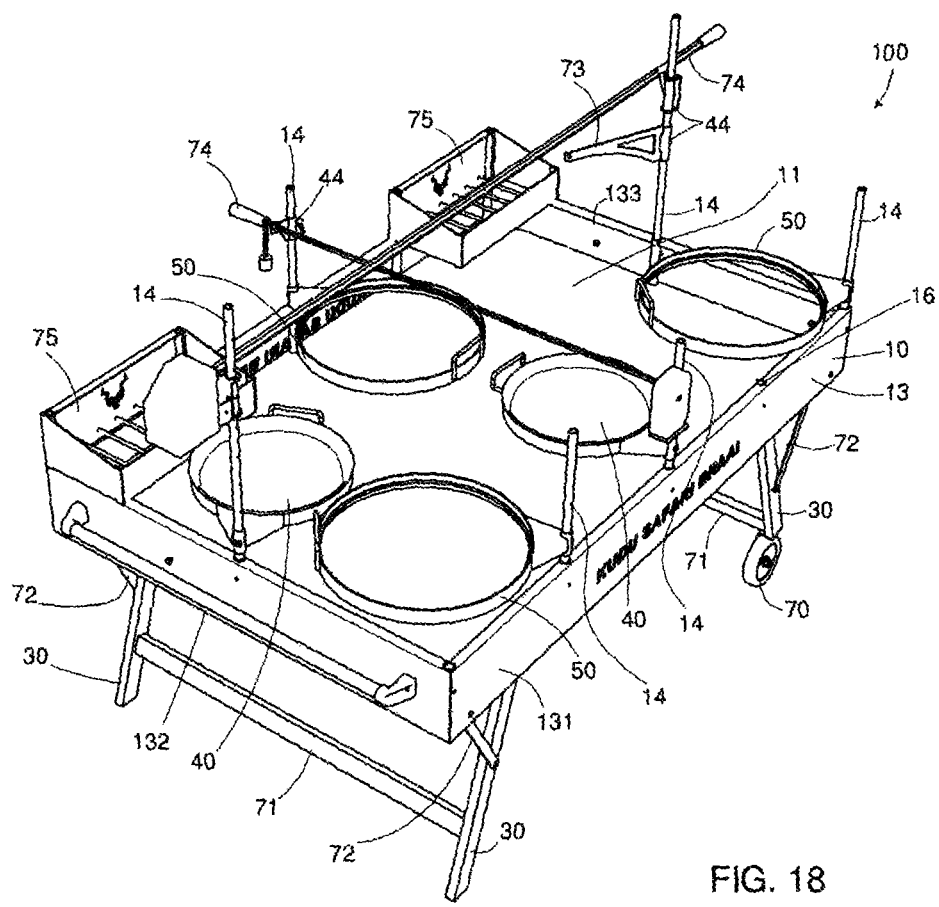
FIG. 18 is a perspective front view of another exemplary fire pit system of the present invention.
Figure 19:
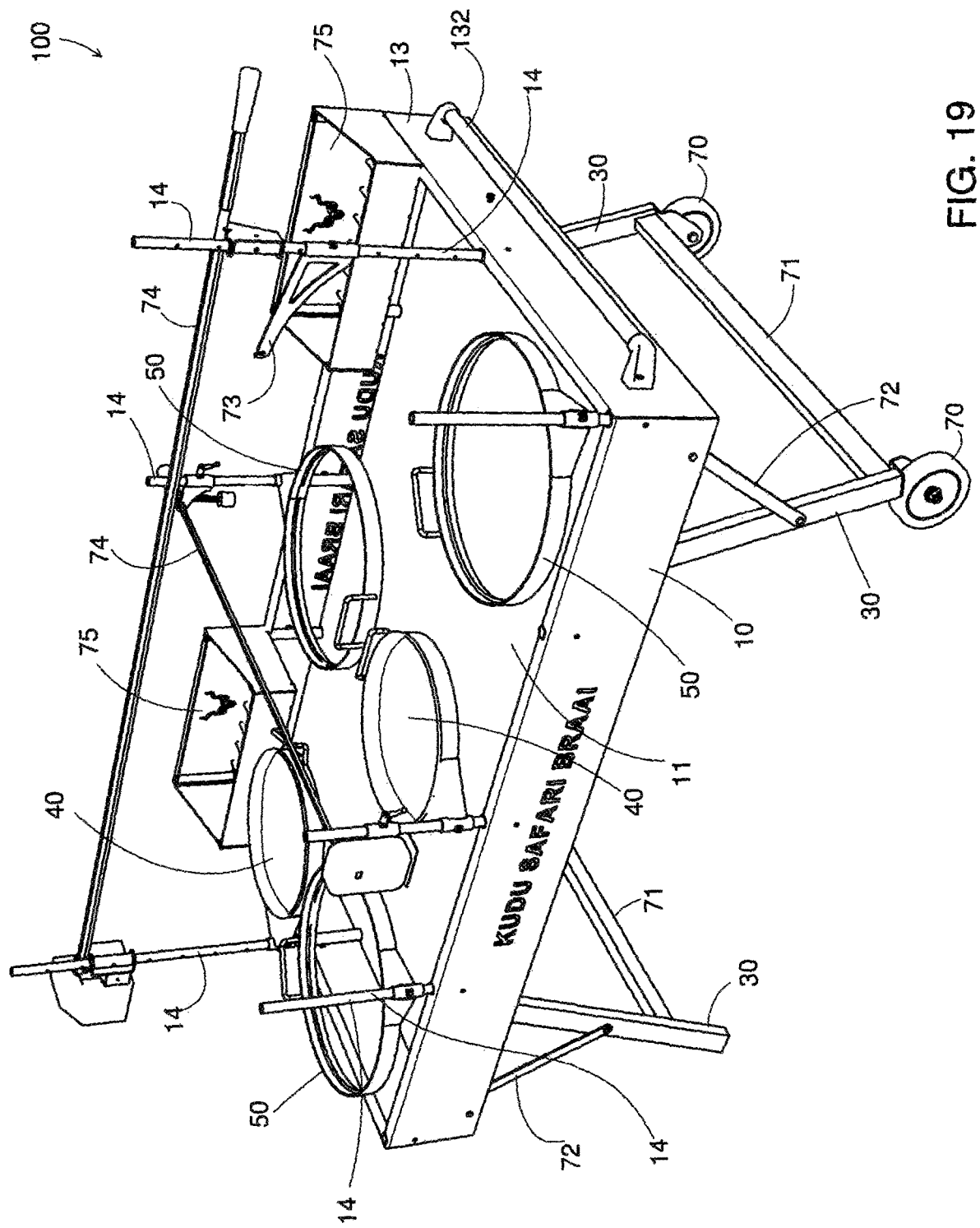
FIG. 19 is a perspective rear view of the exemplary fire pit system shown in FIG. 18.
Figure 20:
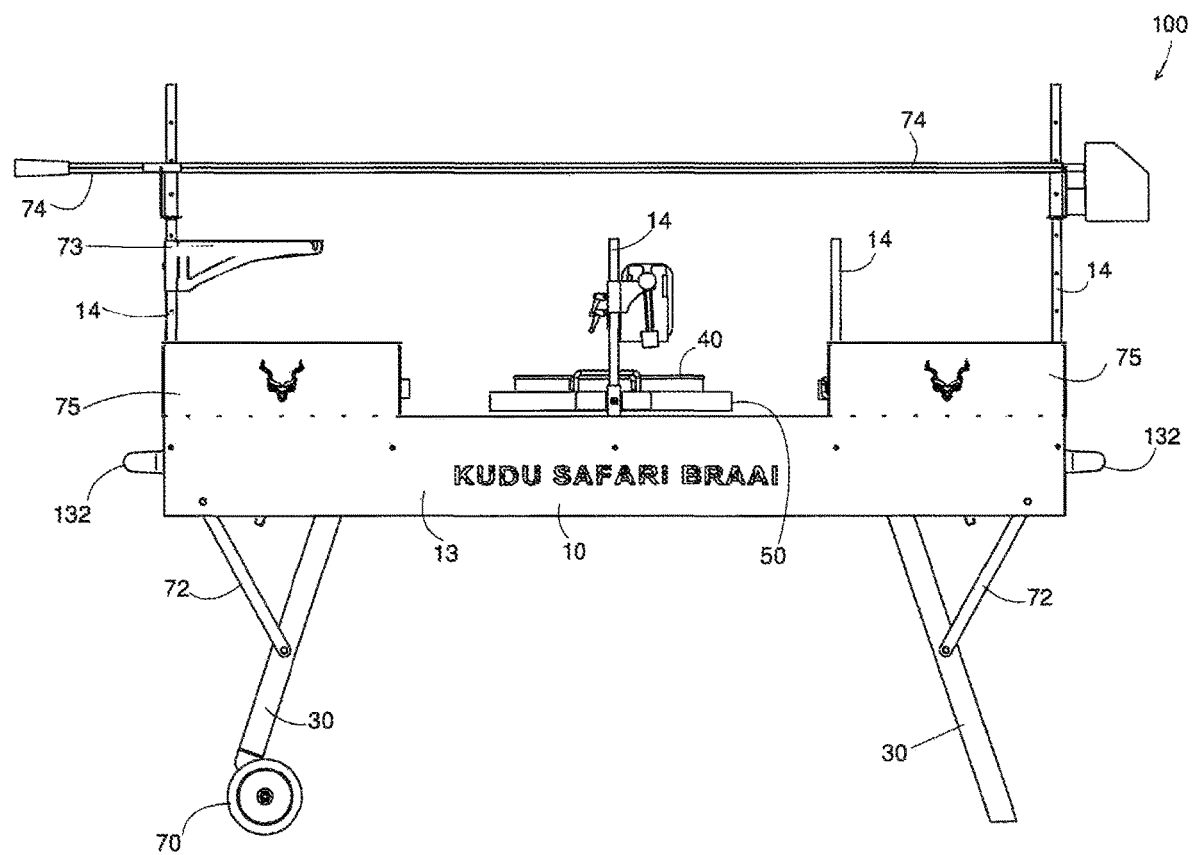
FIG. 20 is a side view of the exemplary fire pit system shown in FIG. 18.
Figure 21A:
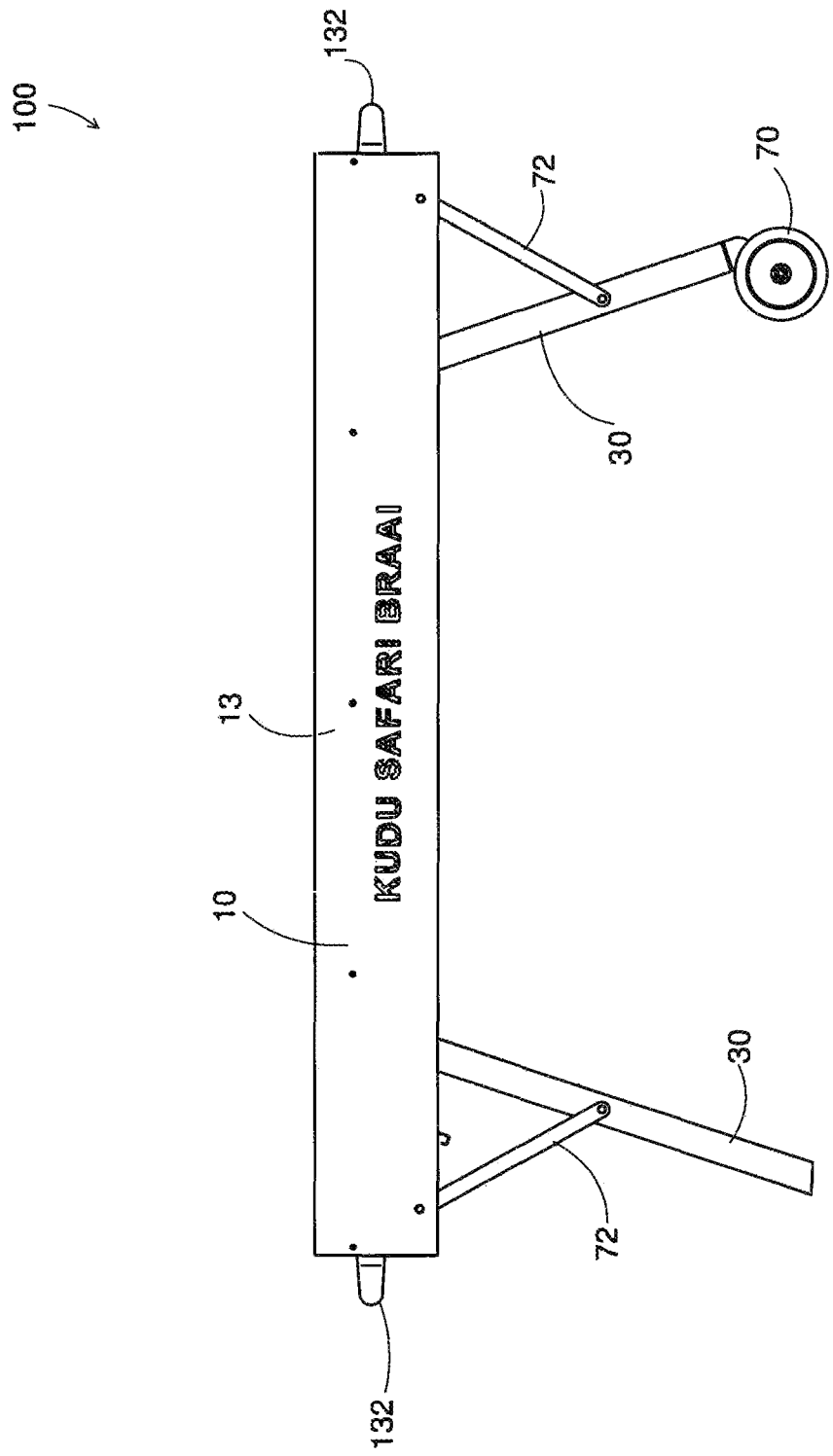
FIG. 21A is a side view of the exemplary fire pit system shown in FIG. 18 when in a "use" position.
Figure 21B:
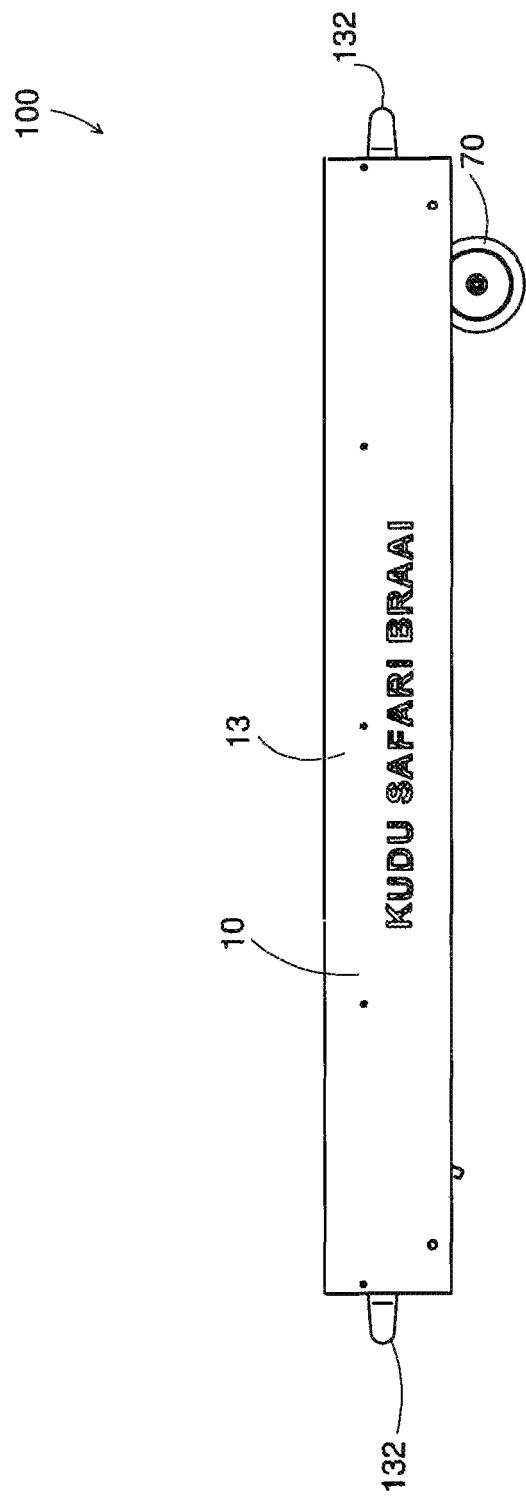
FIG. 21B is a side view of the exemplary fire pit system shown in FIG. 18 when in a "storage" or "transport" position.

1. A fire pit system 100 comprising: (I) a base pan member 10 comprising: a base pan member lower wall 11 having a pan outer periphery 12, and one or more side walls 13 extending upward from said base pan member lower wall 11 and along said pan outer periphery 12; (II) at least two rod members 14 extending upward along opposite sides 15a/5b of said pan outer periphery 12; and (III) one or more additional accessories that are attachable to and detachable from at least one of said at least two rod members 14, said one or more additional accessories comprising a griddle 40, a grill 50, a coffee pot (not shown), a Dutch oven (not shown), a tubular spacer (i.e., not shown, but similar to a ring tubular member 24 alone), a pot holder 73, a horizontal bar 74 extending between two rod members 14 of said at least two rod members 14, a warming tray 75, or any combination thereof. See, for example, the exemplary accessories shown in FIGS. 17-19.

2. The fire pit system 100 of embodiment 1, further comprising a griddle 40 that is attachable to and detachable from at least one of said at least two rod members 14.

3. The fire pit system 100 of embodiment 1 or 2, further comprising a grill 50 that is attachable to and detachable from at least one of said at least two rod members 14.

4. The fire pit system 100 of any one of embodiments 1 to 3, wherein said griddle 40 and said grill 50 are each independently (i) attachable to and detachable from a single rod member 14 of said at least two rod members 14, and (ii) are rotatable from a first position over said base pan member 10 (i.e., a cooking position) to a second position that is not over said base pan member 10 (i.e., a non-cooking position).

5. The fire pit system 100 of any one of embodiments 1 to 4, wherein said griddle 40 comprises one or more griddle connectors 43 designed to connect said griddle 40 to one or more rod members 14 of said at least two rod members 14; and said grill 50 comprises one or more grill connectors 53 designed to connect said grill 50 to one or more rod members 14 of said at least two rod members 14. It should be understood that any connector may be used as said one or more griddle connectors 43 and said one or more grill connectors 53, for example, clamps, nuts/bolts, etc.

6. The fire pit system 100 of any one of embodiments 1 to 5, wherein said griddle 40 comprises one or more griddle tubular members 44 designed to connect said griddle 40 to one or more rod members 14 of said at least two rod members 14; and said grill 50 comprises one or more grill tubular members 54 designed to connect said grill 50 to one or more rod members 14 of said at least two rod members 14. Although not shown, each griddle 40 and each grill 50 may comprise any mechanism for attaching a given griddle 40 and/or grill 50 to one or more rod members 14 of said at least two rod members 14. For example, clamps (not shown), nuts/bolts (not shown), etc. may be used instead of griddle tubular members 44 or grill tubular members 54 although griddle tubular members 44 and grill tubular members 54 are preferred.

7. The fire pit system 100 of any one of embodiments 1 to 6, wherein each of (i) said griddle 40 and (ii) said grill 50 further comprises at least one attachment member 60 designed to temporarily fix (i) said griddle 40 and/or (ii) said grill 50 at a position along one or more of said at least two rod members 14. It should be understood that any type of attachment member 60 may be used to temporarily fix (i) said griddle 40 and/or (ii) said grill 50 at a position along one or more of said at least two rod members 14, for example, clamps, nuts/bolts, etc.

Figure 1:
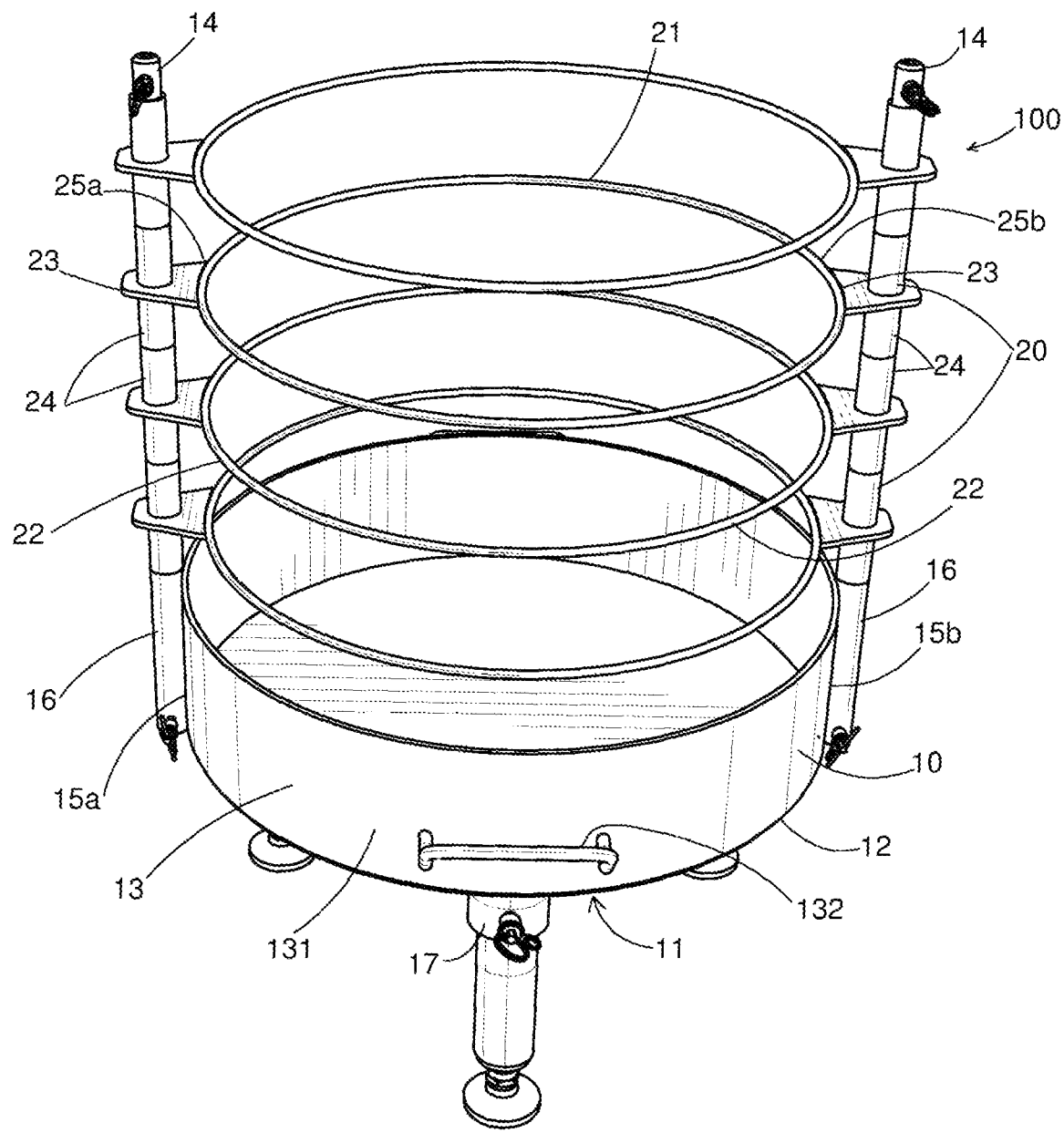
FIG. 1 is a perspective view of an exemplary fire pit system of the present invention.
Figure 2:
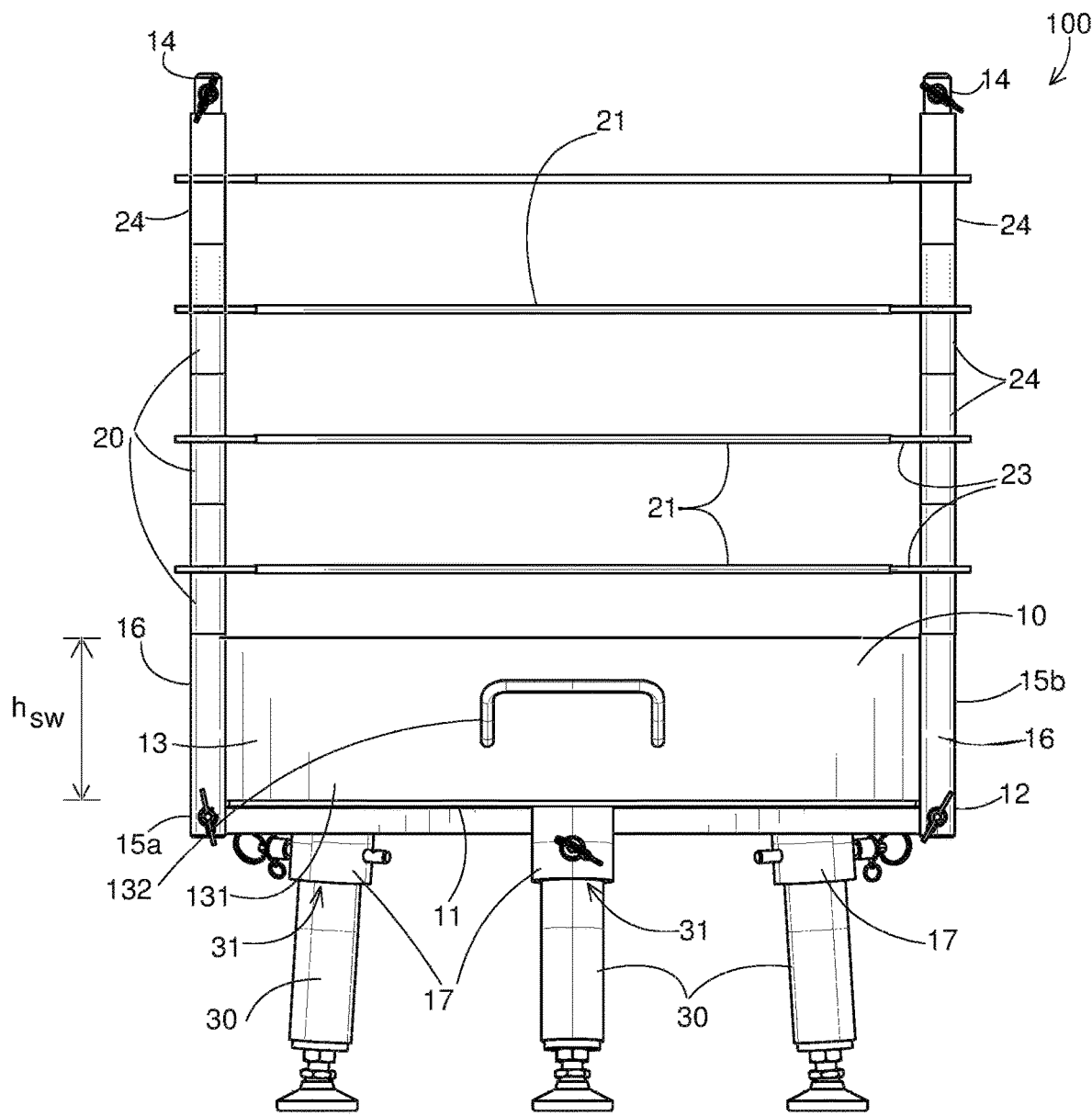
FIG. 2 is a frontal view of the exemplary fire pit system shown in FIG. 1.
Figure 3:
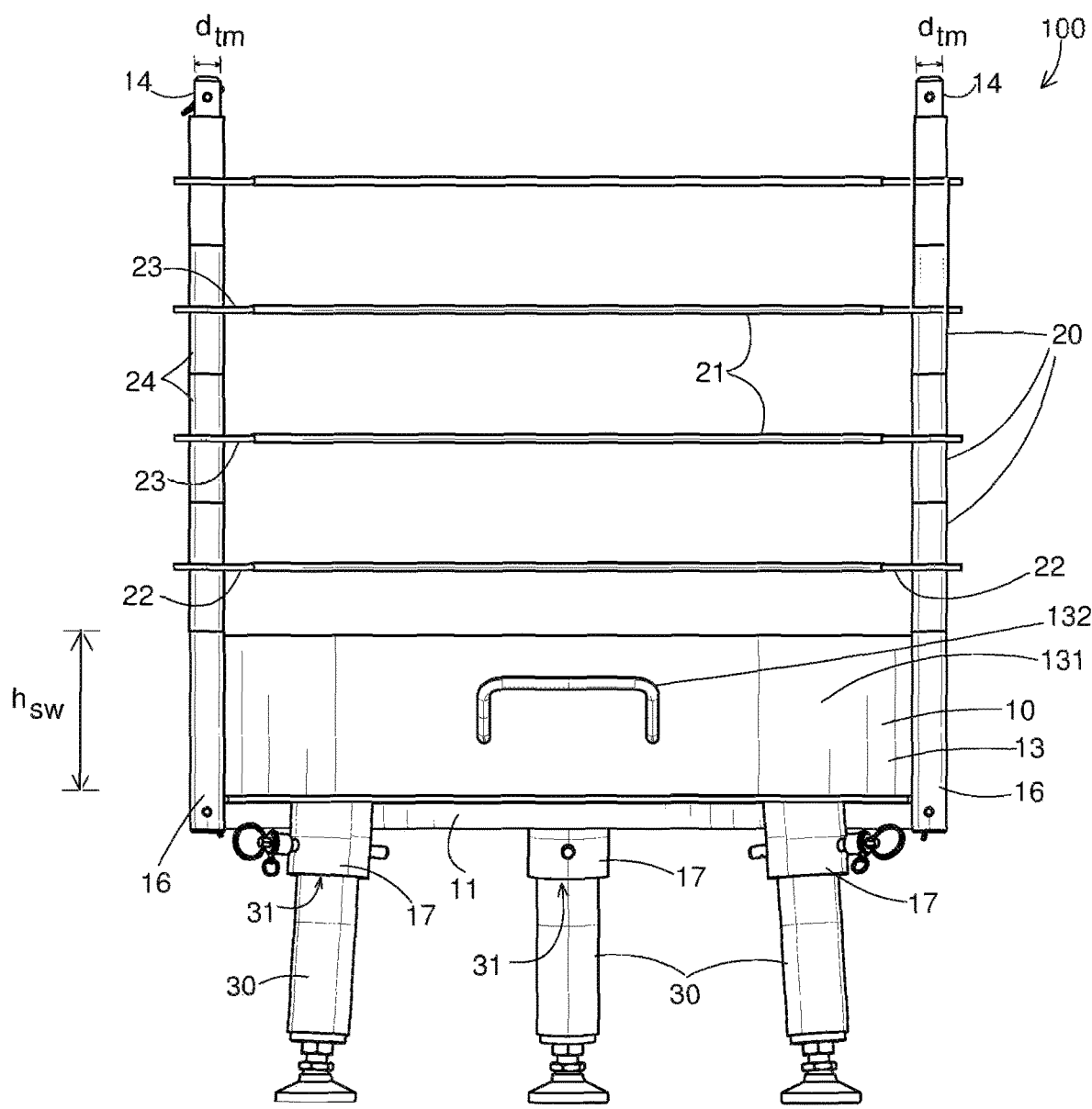
FIG. 3 is a rear view of the exemplary fire pit system shown in FIG. 1.
Figure 4:
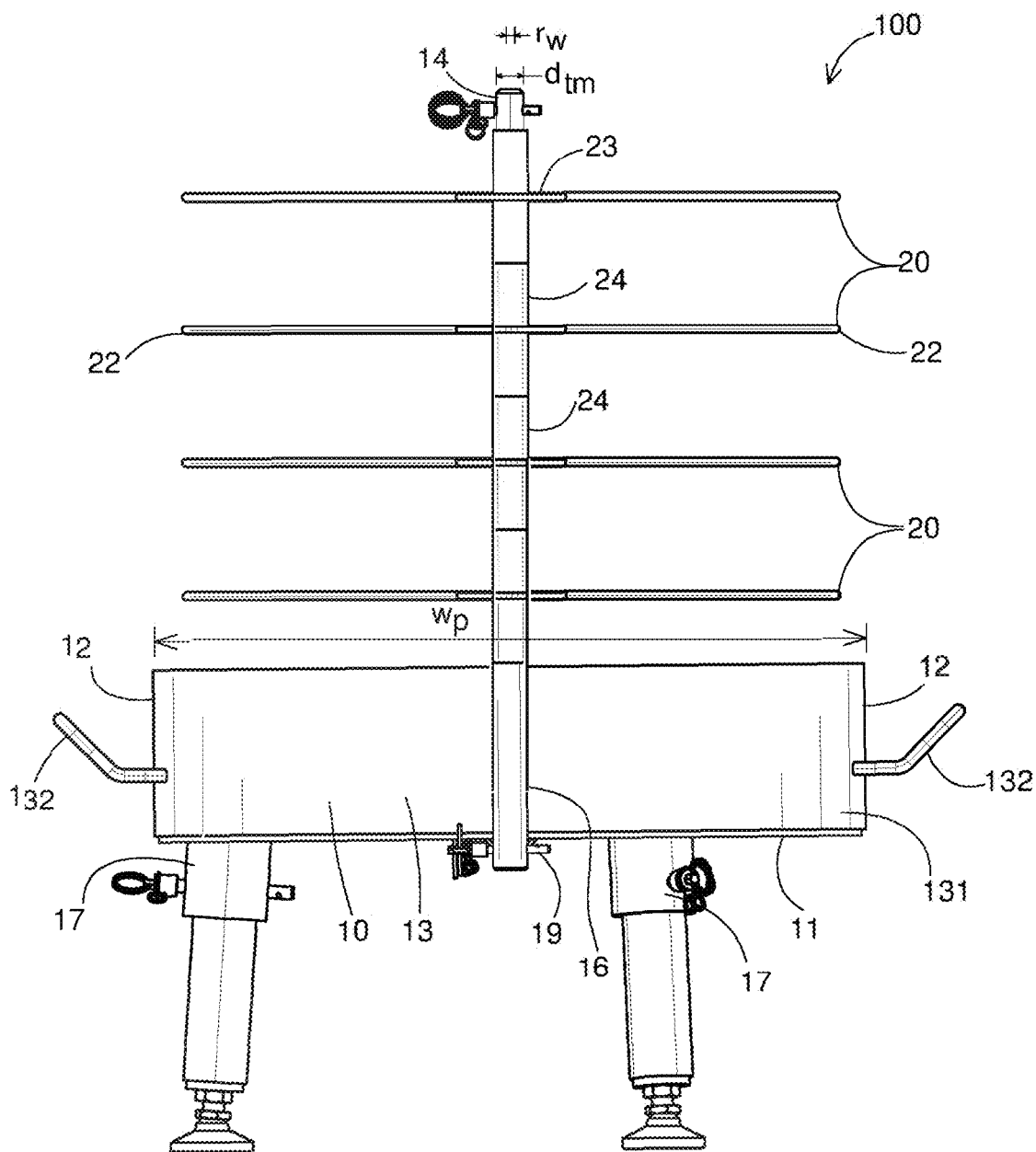
FIG. 4 is a side view of the exemplary fire pit system shown in FIG. 1 as viewed from the right-hand side of the exemplary fire pit system shown in FIG. 1.
Figure 5:
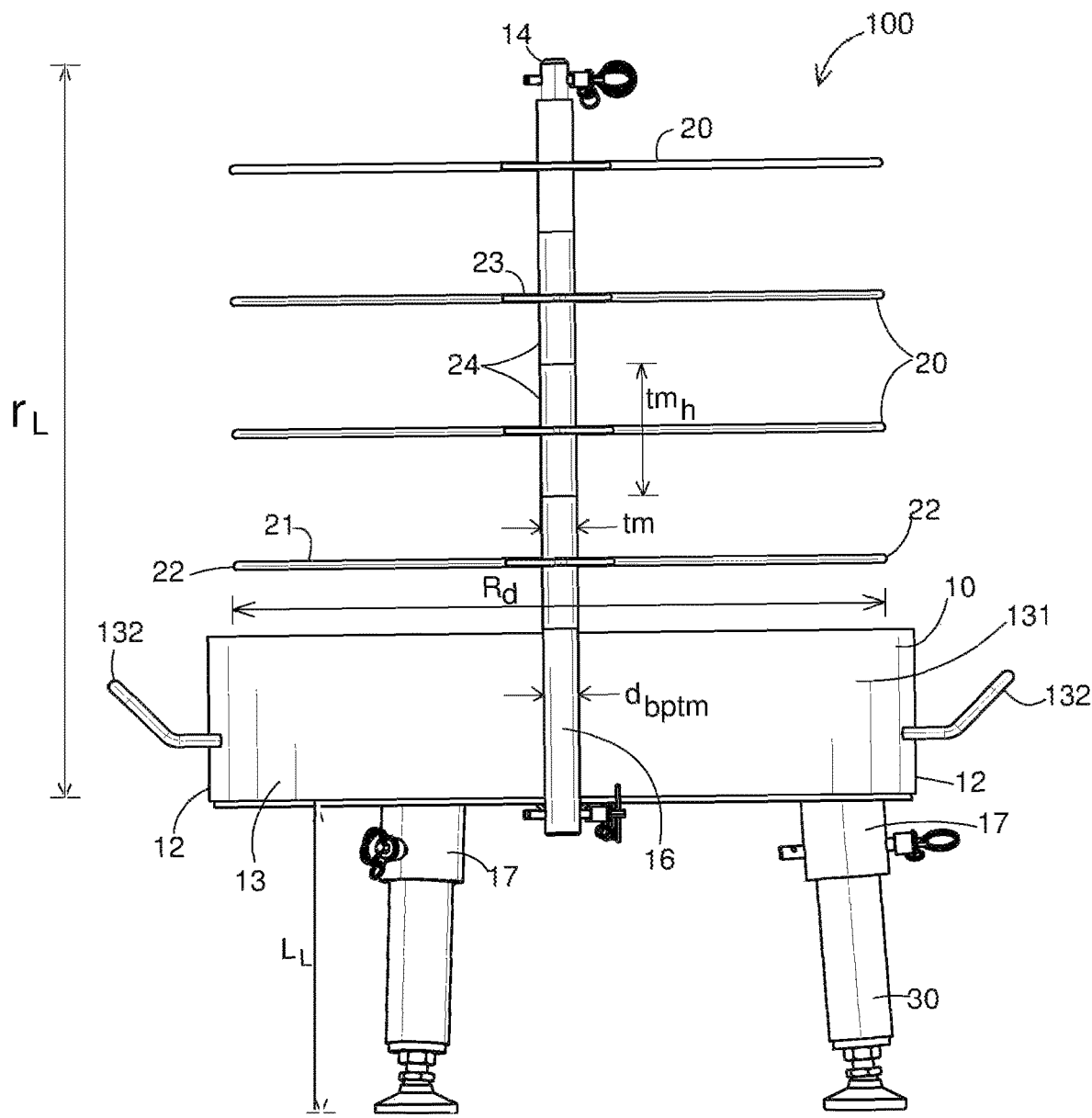
FIG. 5 is a side view of the exemplary fire pit system shown in FIG. 1 as viewed from the left-hand side of the fire pit system shown in FIG. 1.
Figure 6:
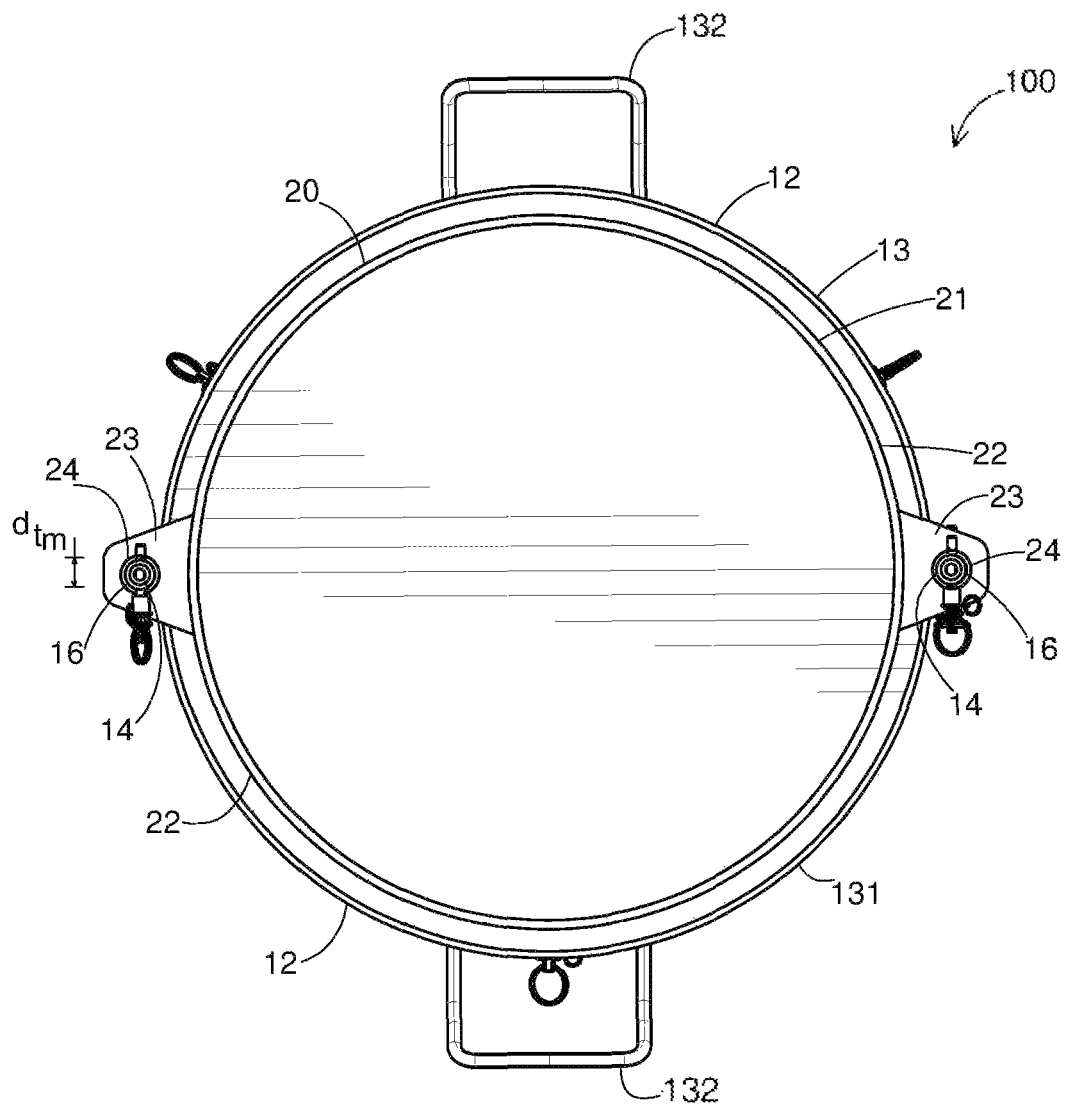
FIG. 6 is a top view of the exemplary fire pit system shown in FIG. 1.
Figure 7:
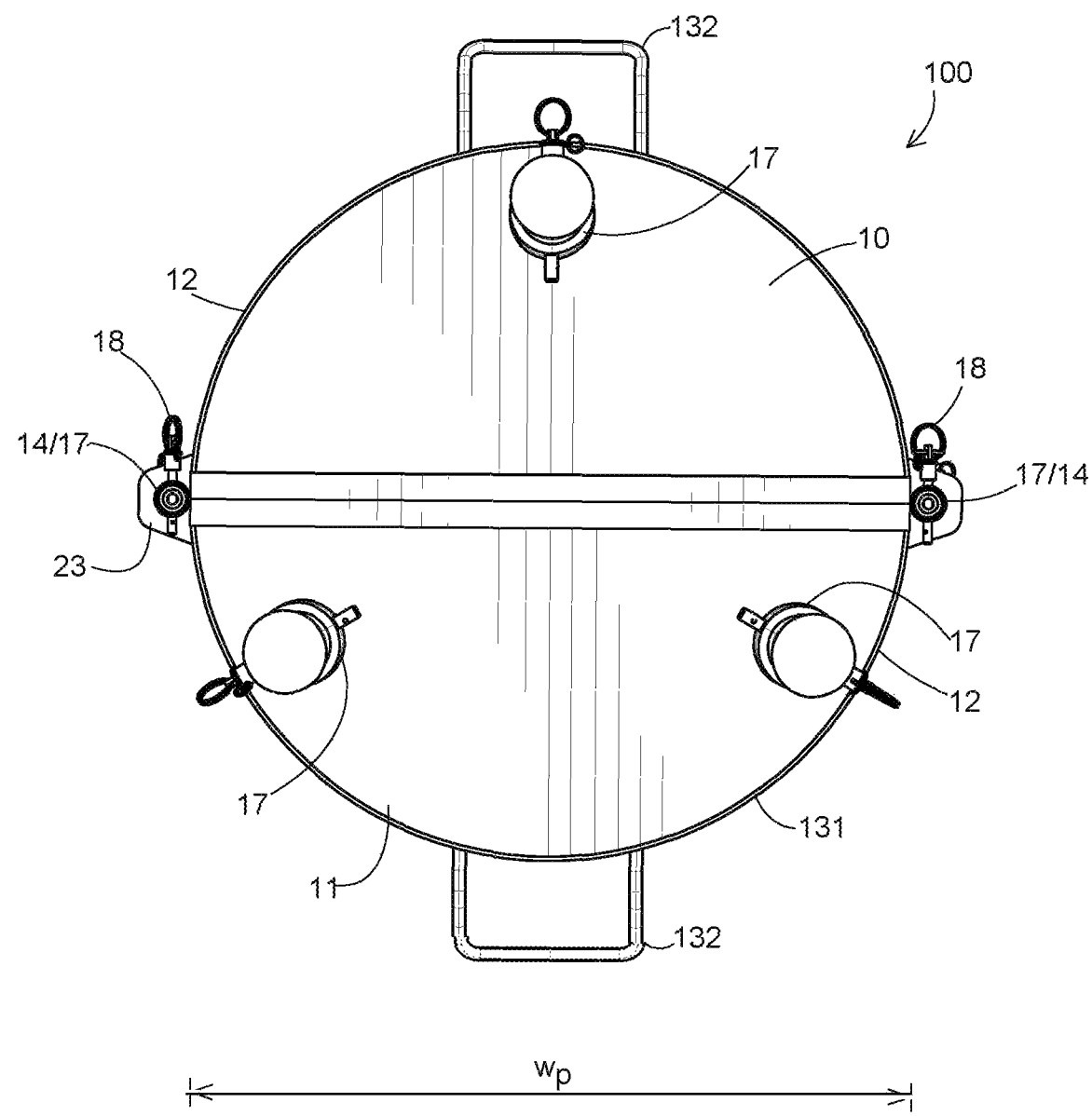
FIG. 7 is a bottom view of the exemplary fire pit system shown in FIG. 1.
Figure 8:
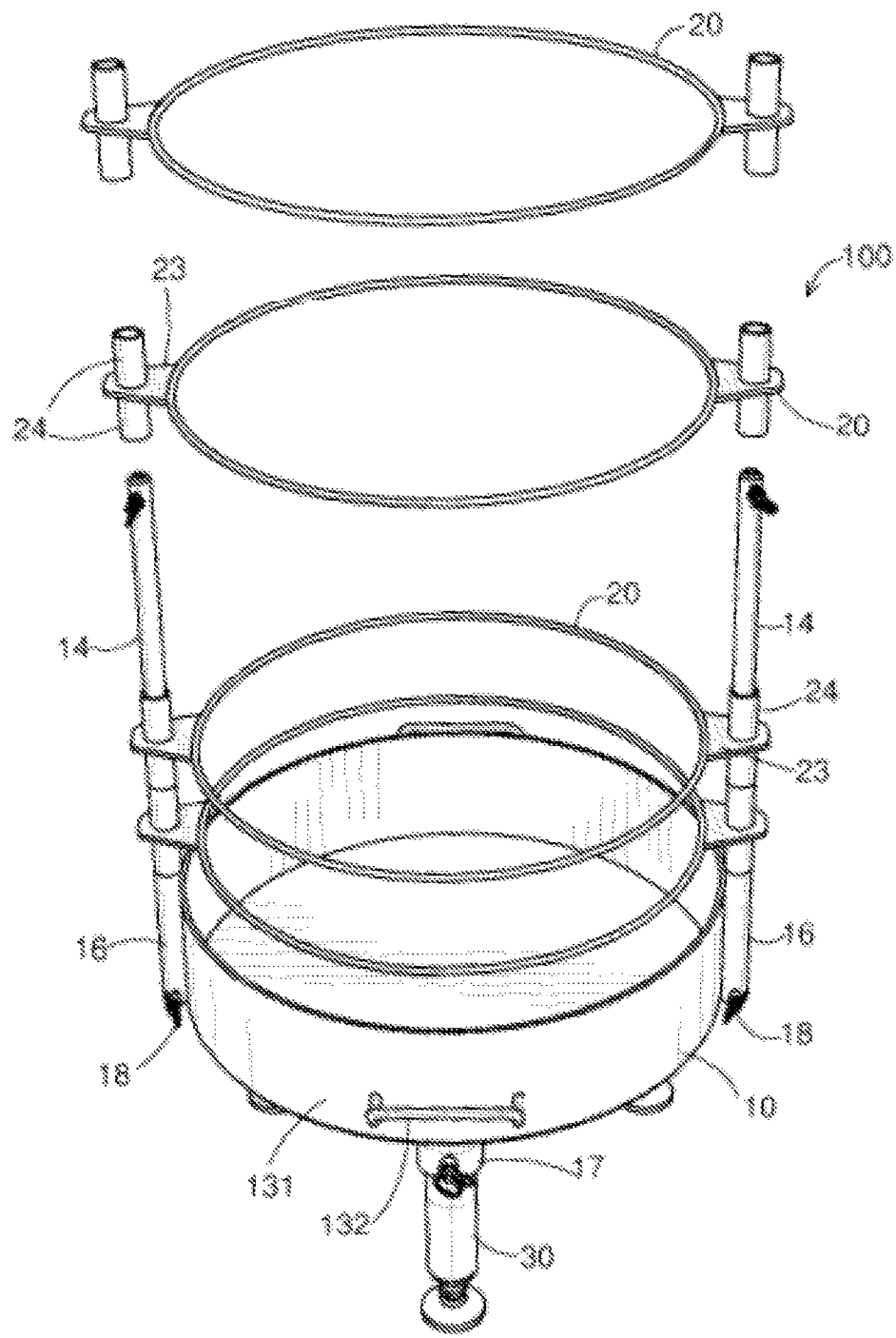
FIG. 8 is a perspective view of the exemplary fire pit system shown in FIG. 1 in a partially disassembled/assembled state.
Figure 9:
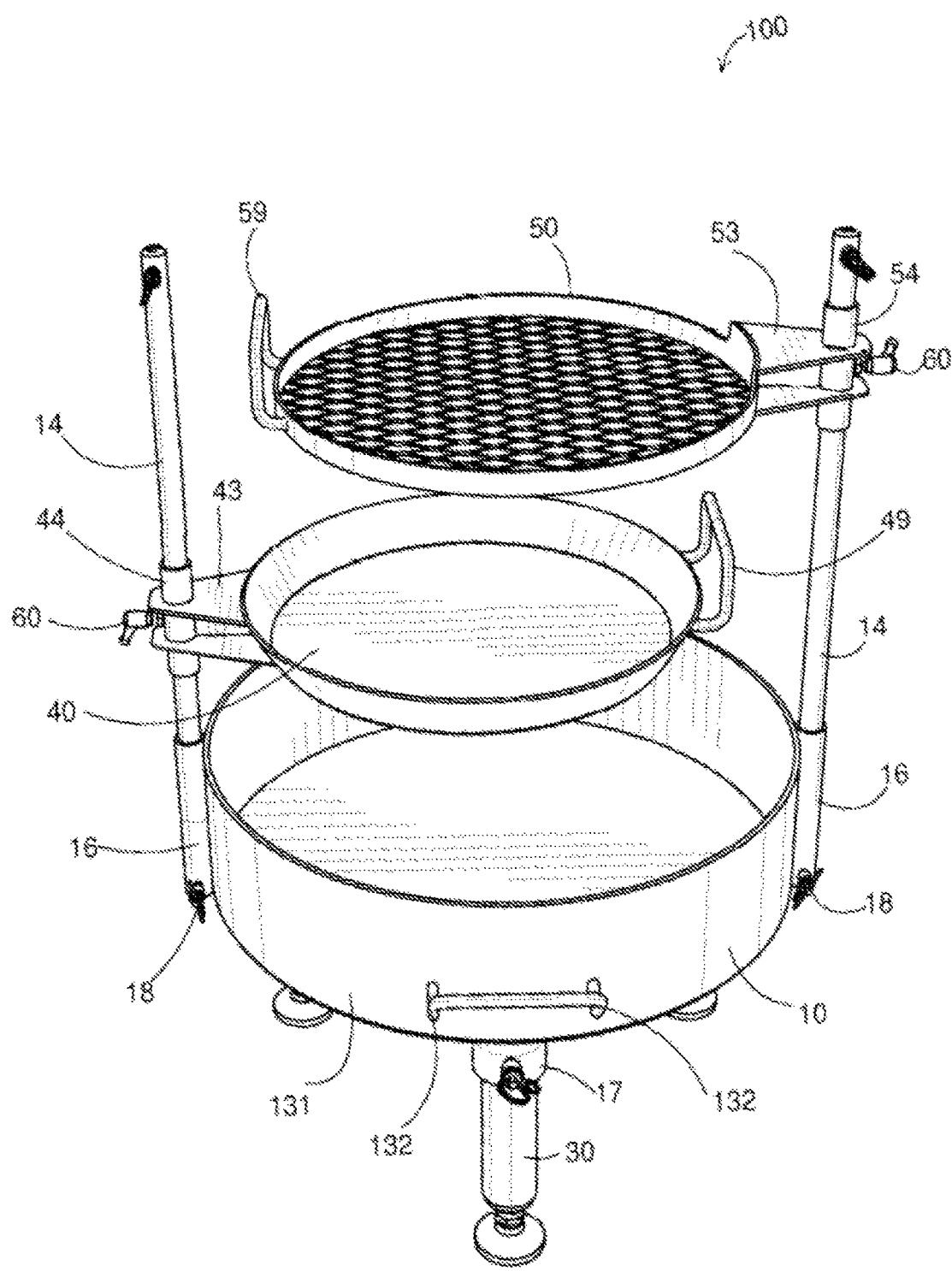
FIG. 9 is a perspective view of another exemplary fire pit system of the present invention.
Figure 10:
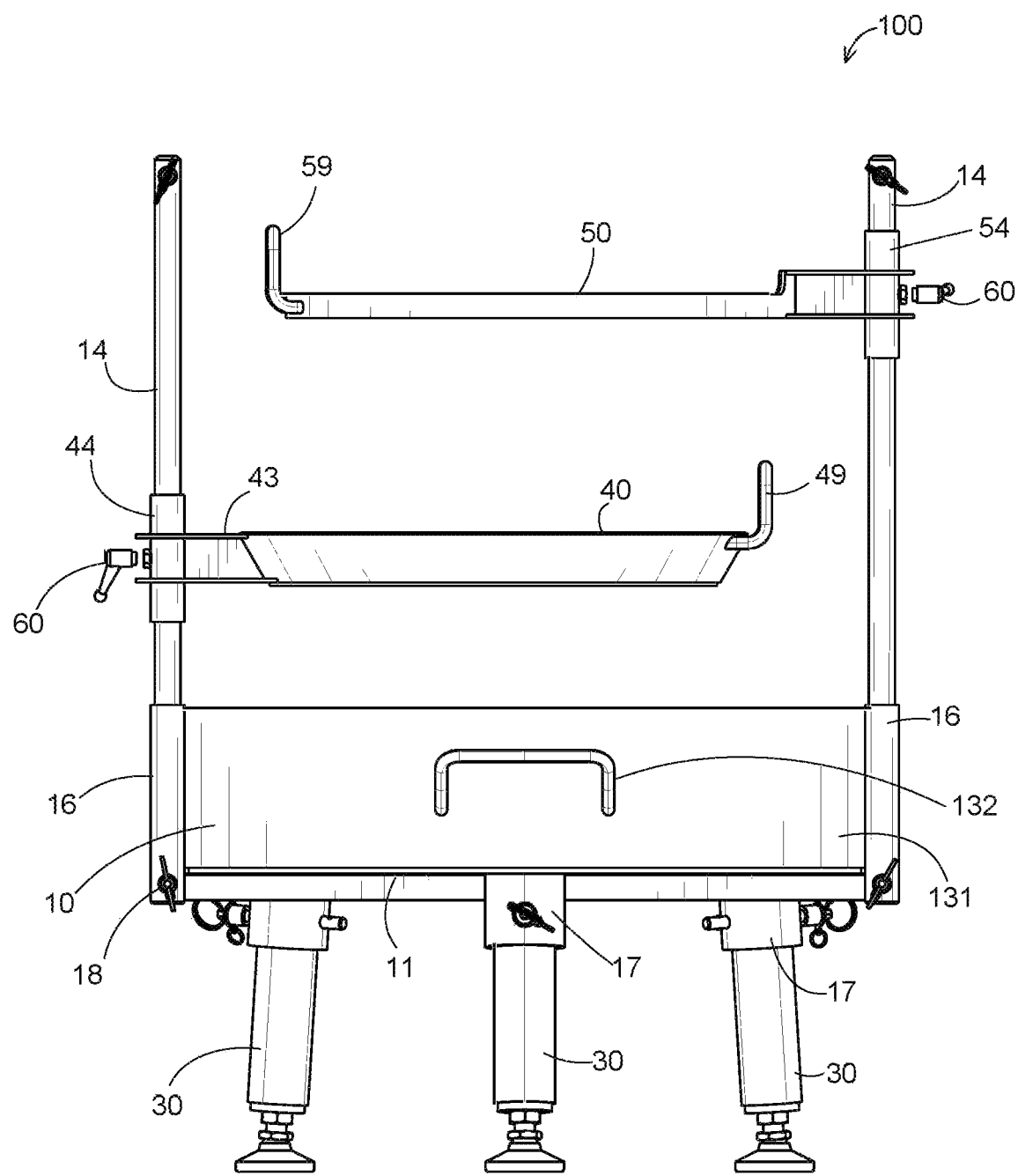
FIG. 10 is a frontal view of the exemplary fire pit system shown in FIG. 9.
Figure 11:
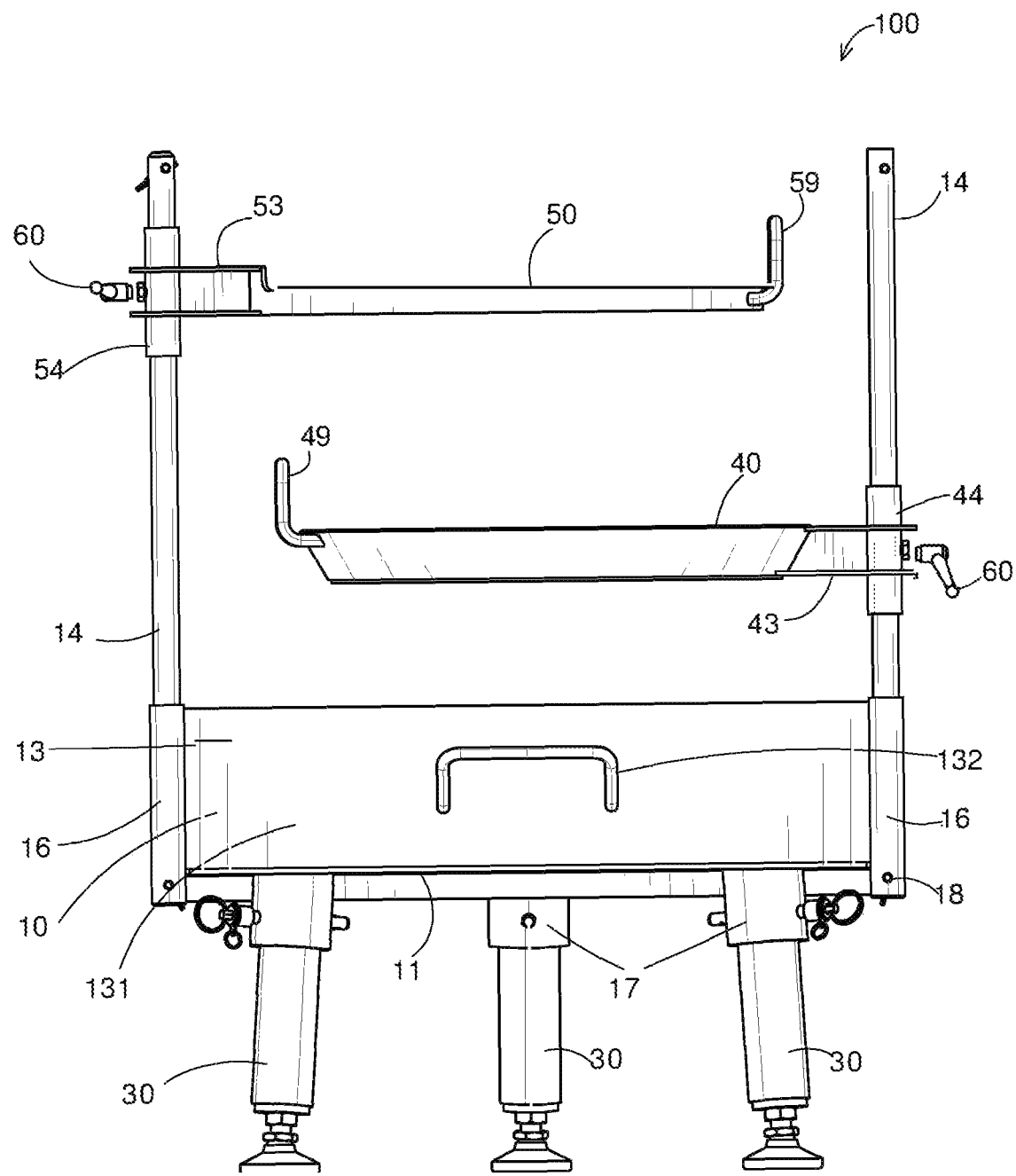
FIG. 11 is a rear view of the exemplary fire pit system shown in FIG. 9.
Figure 12:
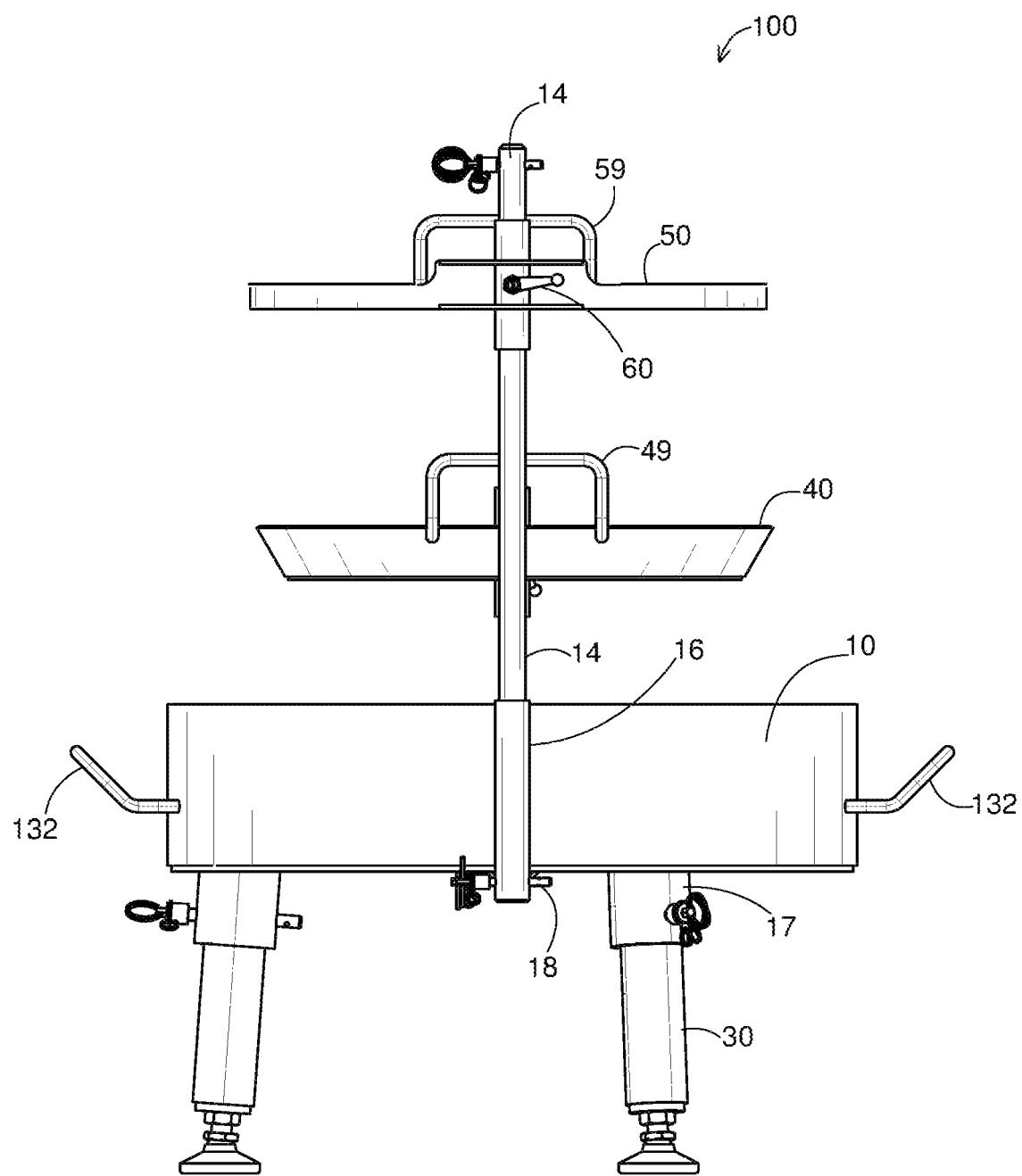
FIG. 12 is a side view of the exemplary fire pit system shown in FIG. 9 as viewed from the right-hand side of the exemplary fire pit system shown in FIG. 9.
Figure 13:
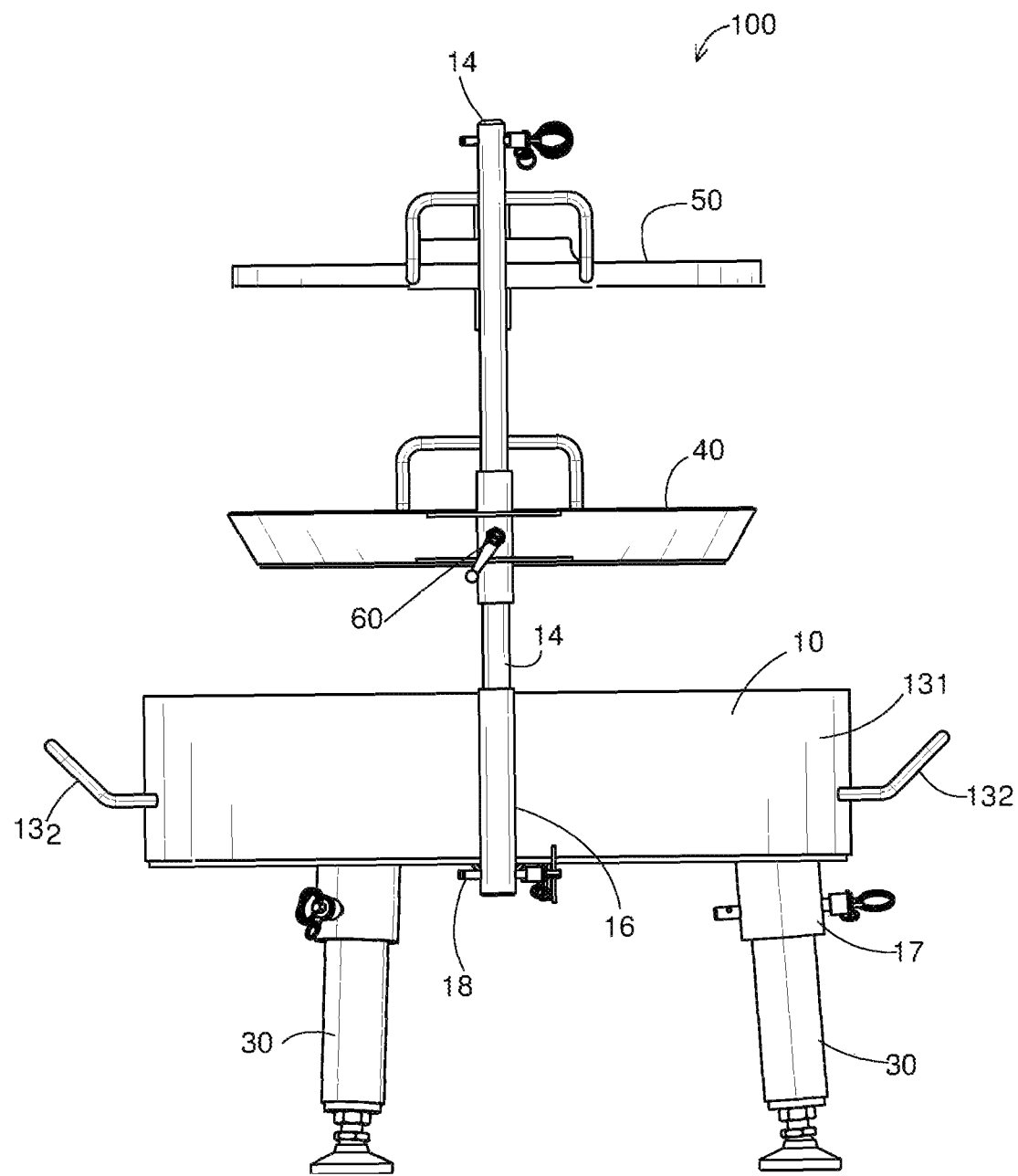
FIG. 13 is a side view of the exemplary fire pit system shown in FIG. 9 as viewed from the left-hand side of the exemplary fire pit system shown in FIG. 9.
Figure 14:
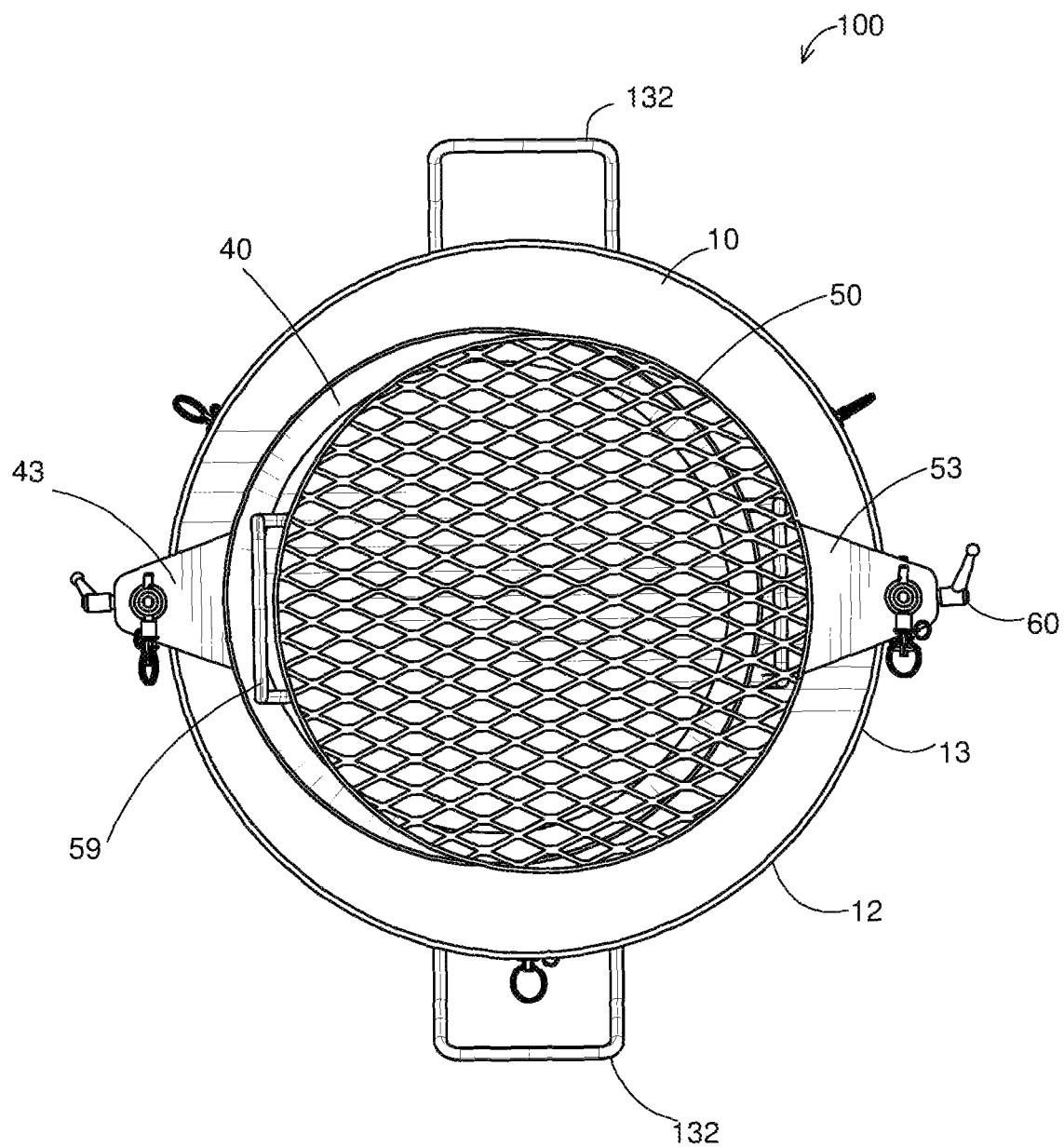
FIG. 14 is a top view of the exemplary fire pit system shown in FIG. 9.
Figure 15:
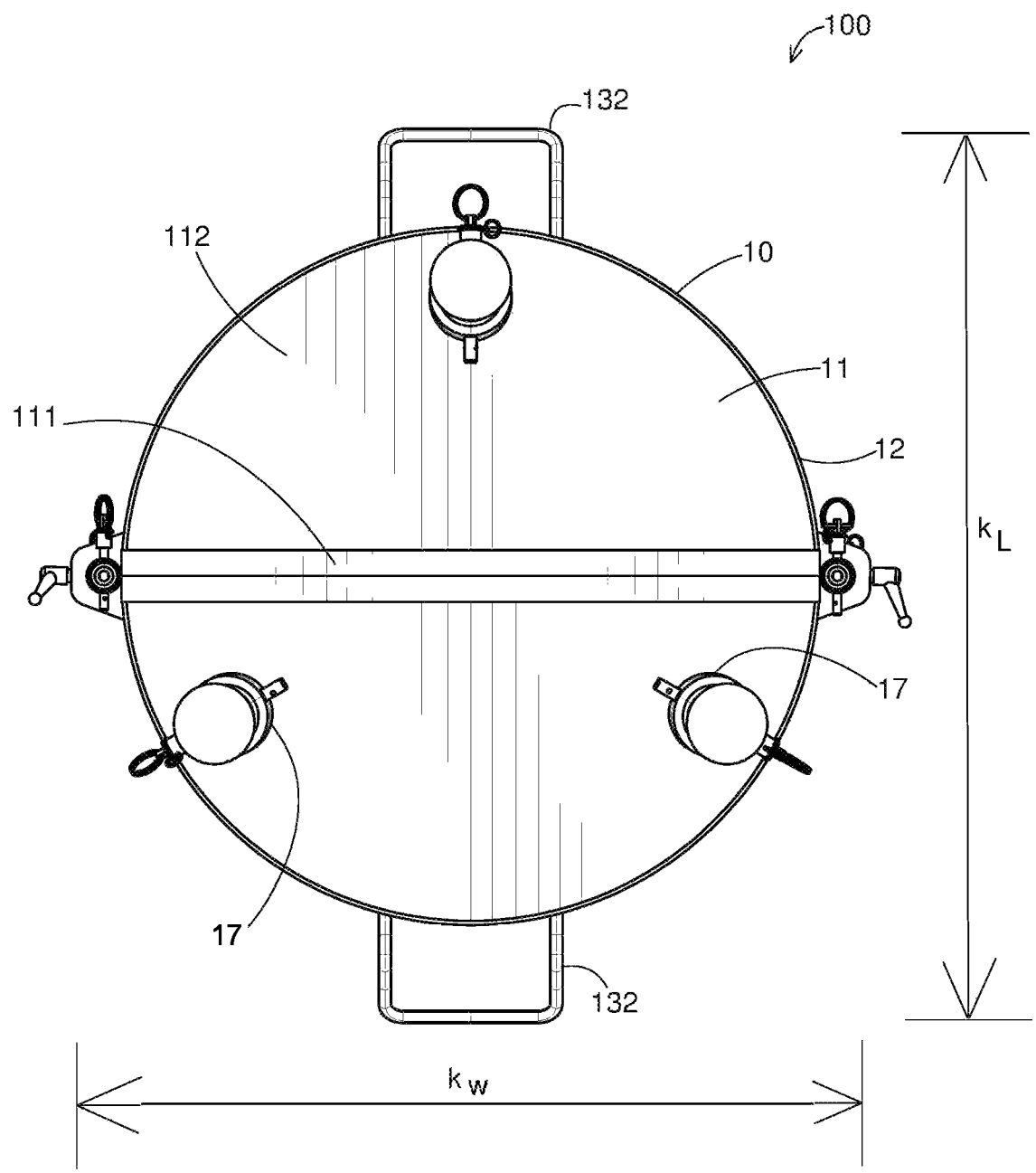
FIG. 15 is a bottom view of the exemplary fire pit system shown in FIG. 9.
Figure 16:
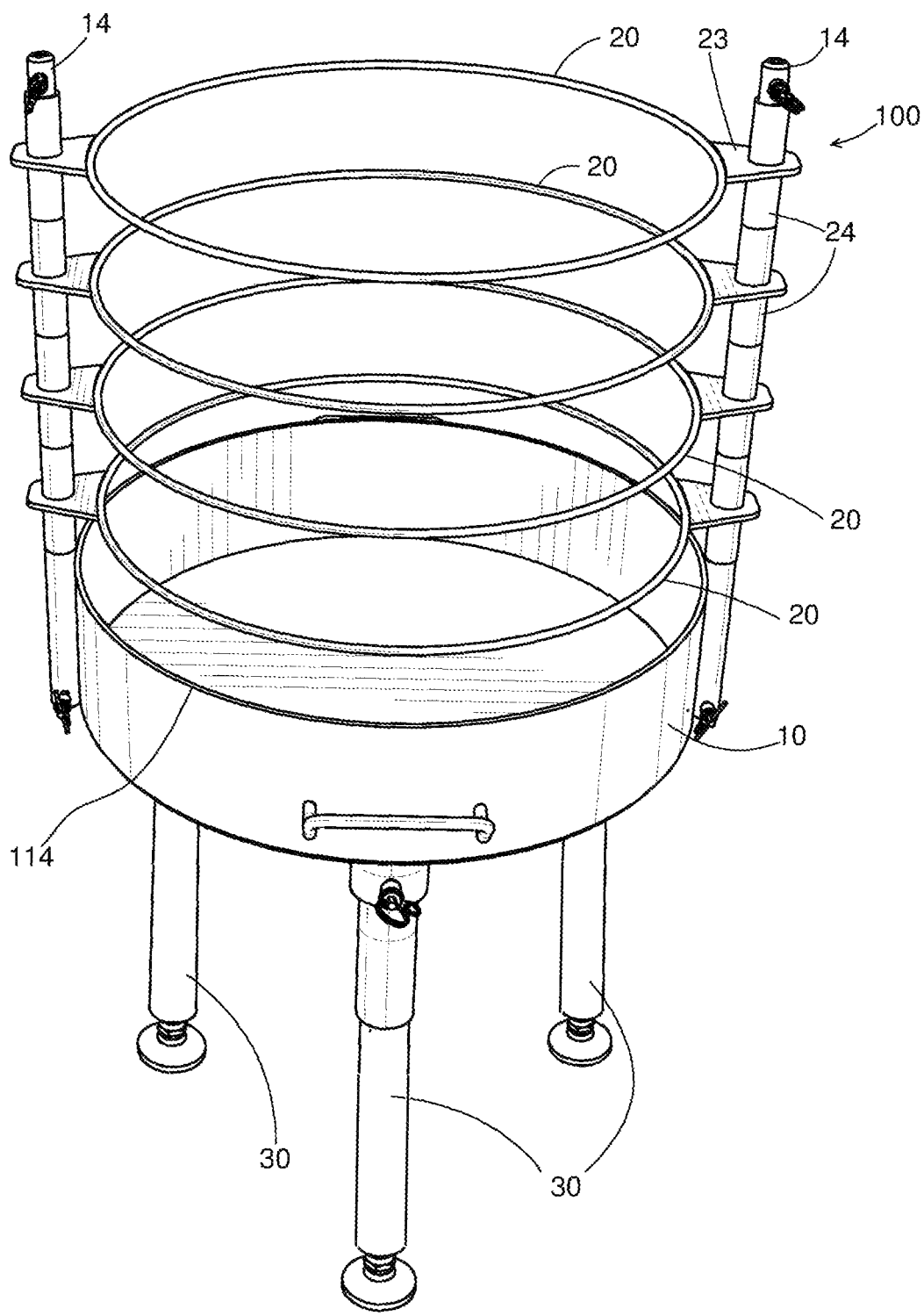
FIG. 16 is a perspective view of an exemplary fire pit system of the present invention assembled and ready for use.

8. The fire pit system 100 of any one of embodiments 1 to 7, wherein said base pan member lower wall 11 comprises a continuous wall (i.e., without apertures therein, although one or more apertures, e.g., drains, could be present in some embodiments if so desired). As shown in FIG. 15, base pan member 10 may further comprise reinforcement member 111 along base pan member bottom surface 112 of base pan member lower wall 11. Although not shown, base pan member 10 may comprise one or more reinforcement members 111 along any surface or edge of base pan member 10 (e.g., along upper edge 114 of base pan member 10 shown in FIG. 16).

9. The fire pit system 100 of any one of embodiments 1 to 8, wherein said base pan member lower wall 11 has a circular shape, said pan outer periphery 12 has a circular shape, and said one or more side walls 13 comprises a single side wall 13 that has a circular shape.

10. The fire pit system 100 of any one of embodiments 1 to 8, wherein said base pan member lower wall 11 has a three or more-sided shape, said pan outer periphery 12 has a three or more-sided shape, and said one or more side walls 13 comprises three or more side walls 13 that have a three or more-sided shape. See, for example, exemplary fire pit system 100 with four sides shown in FIGS. 18-21B. As used herein, the phrase "three or more-sided shape" is used to describe any geometric shape having three or more sides (e.g., a triangle, a square, a rectangle, a hexagon, etc.).

11. The fire pit system 100 of any one of embodiments 1 to 8 or 10, wherein said base pan member lower wall 11 has a four-sided shape, said pan outer periphery 12 has a four-sided shape, and said one or more side walls 13 comprises four side walls 13 that have a four-sided shape. See, for example, exemplary fire pit system 100 shown in FIGS. 18-21B.

12. The fire pit system 100 of embodiment 11, wherein said four-sided shape comprising a rectangular shape, said pan outer periphery 12 has a rectangular shape, and said one or more side walls 13 comprises four side walls 13 that have a rectangular shape. See again, for example, exemplary fire pit system 100 shown in FIGS. 18-21B.

13. The fire pit system 100 of any one of embodiments 1 to 12, wherein said at least two rod members 14 comprises from 4 to about 12 rod members 14.

14. The fire pit system 100 of any one of embodiments 1 to 13, wherein said at least two rod members 14 comprise from 6 to about 10 rod members 14.

15. The fire pit system 100 of any one of embodiments 1 to 14, wherein each of said one or more side walls 13 has a side wall height, $h_{sw}$, that ranges from about 1.0 inch (in) to about 12.0 in (or any value between 1.0 in and 12.0 in, in increments of 0.1 in, e.g., 4.6 in, or any range of values between 1.0 in and 12.0 in, in increments of 0.1 in, e.g., from about 3.0 in to about 4.4 in).

16. The fire pit system 100 of any one of embodiments 1 to 15, wherein said base pan member 10 has a pan width, Wp, that ranges from about 6.0 in to about 42.0 in (or any value between 6.0 in and 42.0 in, in increments of 0.1 in, e.g., 18.0 in, or any range of values between 6.0 in and 42.0 in, in increments of 0.1 in, e.g., from about 16.6 in to about 36.1 in).

17. The fire pit system 100 of any one of embodiments 1 to 16, wherein said base pan member 10 has a pan length that ranges from about 6.0 in to about 90.0 in (or any value between 6.0 in and 90.0 in, in increments of 0.1 in, e.g., 18.0 in, or any range of values between 6.0 in and 90.0 in, in increments of 0.1 in, e.g., from about 16.6 in to about 78.4 in).

18. The fire pit system 100 of any one of embodiments 1 to 17, wherein said base pan member 10 further comprises three or more leg connectors 17 positioned along a lower surface 19 of said base pan member lower wall 11 proximate said pan outer periphery 12, each of said three or more leg connectors 17 being sized to connect to a pan leg 30.

19. The fire pit system 100 of any one of embodiments 1 to 18, wherein said base pan member 10 further comprises four or more leg connectors 17 positioned along a lower surface 19 of said base pan member lower wall 11 proximate said pan outer periphery 12, each of said four or more leg connectors 17 being sized to connect to a pan leg 30.

20. The fire pit system 100 of any one of embodiments 1 to 19, wherein said base pan member 10 further comprises three or more pan legs 30 extending downward from said base pan member lower wall 11 proximate said pan outer periphery 12.

21. The fire pit system 100 of embodiment 20, wherein an upper portion 31 of each of said three or more pan legs 30 is positionable or positioned within a corresponding leg connector 17 of said three or more leg connectors 17.

22. The fire pit system 100 of embodiment 20 or 21, wherein each of said three or more pan legs 30 is moveable from a use position to a storage position, said storage position being a position in which said three or more pan legs 30 are substantially along said base pan member lower wall 11. See, for example, exemplary fire pit system 100 shown in a use position in FIG. 21A and in a storage (or transport) position in FIG. 21B.

23. The fire pit system 100 of any one of embodiments 1 to 22, further comprising two or more wheels 70 positioned below said base pan member lower wall 11. See, for example, exemplary fire pit system 100 shown in FIGS. 18-21B.

24. The fire pit system 100 of any one of embodiments 20 to 23, further comprising two wheels 70 positioned along a lower end of two pan legs 30 within said three or more pan legs 30

25. The fire pit system 100 of any one of embodiments 20 to 24, wherein said three or more pan legs 30 comprises four pan legs 30. As shown in FIGS. 18-21B, exemplary fire pit system 100 comprises four pan legs 30 with a leg stabilizing member 71 extending between a front pair of legs 30 and a rear pair of legs 30. Leg positioning members 72 also connect and position each leg 30 in a use position.

26. The fire pit system 100 of any one of embodiments 20 to 25, wherein each of said three or more pan legs 30 has a leg length, $L_L$, that ranges from about 6.0 in to about 36.0 in (or any value between 6.0 in and 36.0 in, in increments of 0.1 in, e.g., 8.0 in, or any range of values between 6.0 in and 36.0 in, in increments of 0.1 in, e.g., from about 12.6 in to about 28.4 in).

27. The fire pit system 100 of any one of embodiments 1 to 26, wherein each of said at least two rod members 14 has a rod length, $r_L$, that ranges from about 6.0 in to about 36.0 in (or any value between 6.0 in and 36.0 in, in increments of 0.1 in, e.g., 18.0 in, or any range of values between 6.0 in and 36.0 in, in increments of 0.1 in, e.g., from about 12.6 in to about 28.4 in). Although not shown in the figures, it should be noted that a given rod member 14 may comprise a single length of rod material or two or more lengths of rod material combined with one another so as to form the above-mentioned overall rod length, $r_L$. For example, a given rod member 14 may have an overall rod length, $r_L$, of 3.0 feet (ft) with the rod member 14 comprising three sections (not shown) connectable to one another with each section being 1.0 ft in length so as to form the 3.0 ft long rod member 14.

28. The fire pit system 100 of any one of embodiments 1 to 27, wherein each of said at least two rod members 14 has a rod width (i.e., diameter), $r_w$, that ranges from about 0.5 in to about 4.0 in (or any value between 0.5 in and 4.0 in, in increments of 0.1 in, e.g., 1.0 in, or any range of values between 0.5 in and 4.0 in, in increments of 0.1 in, e.g., from about 0.6 in to about 1.5 in).

29. The fire pit system 100 of any one of embodiments 1 to 28, further comprising: (IV) two or more ring members 20, each ring member 20 comprising: a ring base 21 having a ring outer periphery 22, at least two ring connectors 23 along opposite sides 25 a/25 b of said ring outer periphery 22, and at least two ring tubular members 24 extending substantially perpendicular to said ring base 21, said at least two ring tubular members 24 being attached to said ring base 21 via said at least two ring connectors 23; wherein each ring tubular member 24 has a tubular diameter $d_{tm}$ that enables said at least two or more ring members 20 to be positioned and stacked along said at least two rod members 14. As shown in FIGS. 1-17, in some embodiments, fire pit system 100 of the present invention comprises two rod members 14, and each ring member 20 comprises two ring connectors 23 and two ring tubular members 24. In other embodiments, such as shown in FIGS. 18-21B, fire pit system 100 of the present invention may comprise up to twelve, as shown, (i.e., 5 rod members 14 along each longer edge and 3 rod members 14 along the shorter edges) or more two rod members 14, and each ring member 20 (i.e., rectangular ring member 20, not shown) may comprise up to twelve ring connectors 23 and up to twelve ring tubular members 24. Although not shown, it should be understood that each rectangular ring member 20 can have a configuration similar to the configuration of circular ring member 20 shown in FIGS. 1-17 except ring base 21 has a rectangular shape as opposed to a circular shape. Further, although not shown, each ring member 20 may comprise any mechanism for attaching a given ring member 20 to one or more rod members 14 of said at least two rod members 14. For example, clamps (not shown), nuts/bolts (not shown), etc. may be used instead of ring tubular members 24 although ring tubular members 24 are preferred.

30. The fire pit system 100 of embodiment 29, wherein said ring outer periphery 22 has a ring diameter, Rd, that ranges from about 5.0 in to about 34.0 in (or any value between 5.0 in and 34.0 in, in increments of 0.1 in, e.g., 16.0 in, or any range of values between 5.0 in and 34.0 in, in increments of 0.1 in, e.g., from about 11.6 in to about 26.4 in).

31. The fire pit system 100 of embodiment 29 or 30, wherein said ring outer periphery 22 has a ring width, $R_w$, that ranges from about 6.0 in to about 42.0 in (or any value between 6.0 in and 42.0 in, in increments of 0.1 in, e.g., 18.0 in, or any range of values between 6.0 in and 42.0 in, in increments of 0.1 in, e.g., from about 16.6 in to about 36.1 in), and a ring length that ranges from about 6.0 in to about 90.0 in (or any value between 6.0 in and 90.0 in, in increments of 0.1 in, e.g., 18.0 in, or any range of values between 6.0 in and 90.0 in, in increments of 0.1 in, e.g., from about 16.6 in to about 78.4 in).

32. The fire pit system 100 of any one of embodiments 29 to 31, wherein each of said at least two ring tubular members 24 has a tubular member height, $tm_h$, that ranges from about 2.0 in to about 8.0 in (or any value between 2.0 in and 8.0 in, in increments of 0.1 in, e.g., 5.5 in, or any range of values between 2.0 in and 8.0 in, in increments of 0.1 in, e.g., from about 4.2 in to about 6.0 in).

33. The fire pit system 100 of any one of embodiments 29 to 32, wherein each of said at least two ring tubular members 24 has a tubular member width (i.e., diameter), tm, that ranges from about 0.5 in to about 4.0 in (or any value between 0.5 in and 4.0 in, in increments of 0.1 in, e.g., 1.0 in, or any range of values between 0.5 in and 4.0 in, in increments of 0.1 in, e.g., from about 0.6 in to about 1.5 in).

34. The fire pit system 100 of any one of embodiments 29 to 33, wherein said two or more ring members 20 comprises from about 3 to about 8 ring members 20 (or any value between 3 and 8, in increments of 1, e.g., 4, or any range of values between 3 and 8, in increments of 1, e.g., from about 4 to about 7).

35. The fire pit system 100 of any one of embodiments 1 to 34, wherein each of (i) said base pan member 10, (ii) said at least two rod members 14, and (iii) said one or more additional accessories (and (iv) said two or more ring members 20) comprises a material selected from metal, ceramic, polymer, cellulosic, and any combination thereof.

36. The fire pit system 100 of any one of embodiments 1 to 35, wherein each of (i) said base pan member 10, (ii) said at least two rod members 14, and (iii) said one or more additional accessories (and (iv) said two or more ring members 20) comprises aluminum or steel. In some desired embodiments, said base pan member 10, said at least two rod members 14, and said two or more ring members 20 each independently comprises carbon steel.

37. The fire pit system 100 of any one of embodiments 1 to 36, wherein said base pan member 10 further comprises two or more rod member connectors 16 positioned along an outer surface 131 (or an inner surface 133) of said one or more side walls 13, each of said two or more rod member connectors 16 being sized to connect to a rod member 14 of said at least two rod members 14. As shown in FIGS. 1-17, in some embodiments, fire pit system 100 of the present invention comprises two rod member connectors 16. In other embodiments, such as shown in FIGS. 18-21B, fire pit system 100 of the present invention may comprise up to twelve, as shown, rod member connectors 16. Further, as shown in FIGS. 18-21B, rod member connectors 16 may be formed within said one or more side walls 13, as opposed to being positioned along an outer surface 131 or an inner surface 133 of said one or more side walls 13.

38. The fire pit system 100 of any one of embodiments 1 to 37, wherein said base pan member 10 further comprises at least two rod member connectors 16 in the form of base pan tubular members positioned along sides 15a/5b (e.g., opposite sides 15a/15b)(or an inner surface 133) of said pan outer periphery 12, each of said at least two rod member connectors 16 (i.e., in the form of base pan tubular members) having a base pan tubular member diameter $d_{bptm}$ that enables end portions 17 of each of said at least two rod members 14 to be positioned therein. Although not shown, each rod member connector 16 may comprise any mechanism for attaching a given rod member 14 of said at least two rod members 14 to said base pan member 10. For example, clamps (not shown), nuts/bolts (not shown), etc. may be used instead of rod member connectors 16 in the form of base pan tubular members although rod member connectors 16 in the form of base pan tubular members are preferred.

39. The fire pit system 100 of embodiment 38, wherein said base pan member 10 further comprises at least one base pan tubular member stop member 18 within each rod member connector 16, each base pan tubular member stop member 18 being designed to provide a stop for an end portion 171 of a given rod member 14 positioned within the rod member connector 16.

40. The fire pit system 100 of any one of embodiments 29 to 39, wherein said two or more ring members 20 are positionable and stackable along said at least two rod members 14 so that said ring outer periphery 22 is positioned above and within said pan outer periphery 12.

41. The fire pit system 100 of any one of embodiments 29 to 40, wherein each of (i) said base pan member 10, (ii) said at least two rod members 14, (iii) said one or more additional accessories, and (iv) said two or more ring members 20 are attachable and detachable from one another.

42. The fire pit system 100 of any one of embodiments 20 to 41, wherein each of said three or more pan legs 30 are attachable and detachable from said base pan member 10.

43. The fire pit system 100 of any one of embodiments 20 to 24 and 26 to 42, wherein said three or more pan legs 30 comprises three pan legs 30.

44. The fire pit system 100 of any one of embodiments 1 to 43, wherein said base pan member 10 further comprises one or more handles 132 positioned along an outer side surface 131 of said base pan member 10, each of said one or more handles 132 being sized so as to enable a user to grasp and move said base pan member 10.

45. The fire pit system 100 of embodiment 44, wherein said one or more handles 132 comprises two handles 132 on opposite sides of said base pan member 10. As shown in FIGS. 9-14, griddle 40 may also comprise one or more griddle handles 49 on opposite sides of griddle 40, and grill 50 may also comprise one or more grill handles 59 on opposite sides of grill 50.

Kits for Forming Fire Pit Systems

46. A kit 200 for forming the fire pit system 100 of any one of embodiments 1 to 45, said kit 200 comprising any combination of the fire pit system 100 components and features recited in embodiments 1 to 45. For example, some kits 200 may comprise base pan member 10, at least two rod members 14, and two or more ring members 20. Other kits 200 may comprise base pan member 10, at least two rod members 14, two or more ring members 20, griddle 40, and said grill 50. Yet other kits 200 may comprise base pan member 10, at least two rod members 14, three to six ring members 20, griddle 40, grill 50, and three pan legs 30. Yet other kits 200 may comprise base pan member 10, from four to ten rod members 14, three to six ring members 20, griddle 40, grill 50, four pan legs 30, and at least two wheels 70. In addition, kits 200 may further comprise any of the above-described accessories such as a coffee pot (not shown), a Dutch oven (not shown), a tubular spacer (i.e., not shown, but similar to a ring tubular member 24 alone), a pot holder 73, a horizontal bar 74 extending between two rod members 14 of said at least two rod members 14, a warming tray 75, In all kits 200, the kit components are attachable and detachable from one another, so that the kit components can be at least partially nested with one another for storage and transport. See, for example, partially nested kit components in exemplary kit 200 shown in FIG. 20. See also, transportable fire pit system 100 shown in FIG. 21B, which may provide storage of one or more accessories above or below base pan member lower wall 11.

47. A kit 200 for forming a fire pit system 100, said kit 200 comprising: (I) a base pan member 10 comprising: a base pan member lower wall 11 having a pan outer periphery 12, and one or more side walls 13 extending upward from said base pan member lower wall 11 and along said pan outer periphery 12; (II) at least two rod members 14 extending upward along opposite sides 15 $a$/15 $b$ of said pan outer periphery 12; and one or more of: (III)(A) a griddle 40 that is attachable to and detachable from at least one of said at least two rod members 14; (III)(B) a grill 50 that is attachable to and detachable from at least one of said at least two rod members 14; and (III)(C) two or more ring members 20, each ring member 20 comprising: a ring base 21 having a ring outer periphery 22, at least two ring connectors 23 along opposite sides 25 $a$/25 $b$ of said ring outer periphery 22, and at least two ring tubular members 24 extending substantially perpendicular to said ring base 21, said at least two ring tubular members 24 being attached to said ring base 21 via said at least two ring connectors 23; wherein each ring tubular member 24 has a tubular diameter $d_{tm}$ that enables said two or more ring members 20 to be positioned and stacked along said at least two rod members 14.

48. The kit 200 of embodiment 47, further comprising three or more pan legs 30 extending downward from said base pan member lower wall 11 proximate said pan outer periphery 12.

49. The kit 200 of embodiment 48, further comprising two or more wheels 70 connected to at least two legs 30 within said three or more pan legs 30.

50. The kit 200 of any one of embodiments 47 to 49, wherein said kit 200 comprises (III)(A) a griddle 40 that is attachable to and detachable from at least one of said at least two rod members 14.

51. The kit 200 of any one of embodiments 47 to 50, wherein said kit 200 comprises (III)(B) a grill 50 that is attachable to and detachable from at least one of said at least two rod members 14.

52. The kit 200 of any one of embodiments 47 to 51, wherein said kit 200 comprises (III)(C) two or more ring members 20, each ring member 20 comprising: a ring base 21 having a ring outer periphery 22, at least two ring connectors 23 along opposite sides 25$a$/25$b$ of said ring outer periphery 22, and at least two ring tubular members 24 extending substantially perpendicular to said ring base 21, said at least two ring tubular members 24 being attached to said ring base 21 via said at least two ring connectors 23; wherein each ring tubular member 24 has a tubular diameter $d_{tm}$ that enables said two or more ring members 20 to be positioned and stacked along said at least two rod members 14.

53. The kit 200 of any one of embodiments 47 to 52, wherein said kit 200 comprises from three to six ring members 20.

54. The kit 200 of any one of embodiments 47 to 53, wherein said kit 200 has overall kit dimensions comprising (i) a kit height ranging from about 5.0 in to about 24.0 in (or any value between 5.0 in and 24.0 in, in increments of 0.1 in, e.g., 12.0 in, or any range of values between 5.0 in and 24.0 in, in increments of 0.1 in, e.g., from about 12.8 in to about 14.6 in), (ii) a kit width, kw, ranging from about 8.0 in to about 36.0 in (or any value between 8.0 in and 36.0 in, in increments of 0.1 in, e.g., 24.0 in, or any range of values between 8.0 in and 36.0 in, in increments of 0.1 in, e.g., from about 16.8 in to about 24.4 in), and (iii) a kit width ranging from about 8.0 in to about 82.0 in (or any value between 8.0 in and 82.0 in, in increments of 0.1 in, e.g., 24.0 in, or any range of values between 8.0 in and 82.0 in, in increments of 0.1 in, e.g., from about 16.8 in to about 24.4 in).

55. The kit 200 of any one of embodiments 47 to 54, further comprising a carrying case (not shown) sized to house said kit 200 for storage and transport.

Methods of Making Fire Pit Systems

56. A method of making the fire pit system 100 of any one of embodiments 1 to 45 or the kit 200 of any one of embodiments 46 to 55, said method comprising: forming the base pan member 10; forming the at least two rod members 14; and forming at least one of: (I) the two or more ring members 20, (II) the griddle 40, and (III) the grill 50.

57. The method of embodiment 56, wherein said method comprises forming the griddle 40.
58. The method of embodiment 56 or 57, wherein said method comprises forming the grill 50.
59. The method of any one of embodiments 56 to 58, wherein said method comprises forming the two or more ring members 20.
60. The method of any one of embodiments 56 to 59, wherein each forming step independently comprises at least one of a machining step, a welding step, a cutting step, a thermoforming step, a heat-setting step, or any combination thereof.

Methods of Using Fire Pit Systems

61. A method of using the fire pit system 100 of any one of embodiments 1 to 45 or the kit 200 of any one of embodiments 46 to 56, said method comprising: burning a combustible material (not shown) within the base pan member 10.
62. The method of embodiment 61, wherein the combustible material comprises wood, charcoal, lump charcoal, or any combination thereof.
63. The method of any one of embodiments 56 to 62, further comprising: attaching the at least two rod members 14 to the base pan member 10.
64. The method of any one of embodiments 56 to 63, further comprising: attaching the three or more pan legs 30 to the base pan member 10.
65. The method of any one of embodiments 56 to 64, further comprising: attaching one or more additional accessories to at least one of the at least two rod members 14, the one or more additional accessories comprising a griddle 40, a grill 50, a coffee pot (not shown), a Dutch oven (not shown), a tubular spacer (i.e., not shown, but similar to a ring tubular member 24 alone), a pot holder 73, a horizontal bar 74 extending between two rod members 14 of said at least two rod members 14, a warming tray 75, or any combination thereof.
66. The method of any one of embodiments 56 to 65, further comprising: cooking food (not shown) above the base pan member 10.
67. The method of any one of embodiments 61 to 66, further comprising: positioning the combustible material (not shown) within the base pan member 10.
68. The method of any one of embodiments 56 to 67, further comprising: positioning the two or more ring members 20 on the at least two rod members 14.
69. The method of any one of embodiments 61 to 68, further comprising: positioning the two or more ring members 20 along the at least two rod members 14 so as to prevent the combustible material (not shown) from falling out of the base pan member 10.
70. The method of any one of embodiments 56 to 69, further comprising: disassembling all of the components of the fire pit system 100.
71. The method of any one of embodiments 56 to 70, further comprising: packaging all of the components of the fire pit system 100 within a carrying case (not shown).

It should be understood that although the above-described fire pit systems, and methods are described as "comprising" one or more components or steps, the above-described fire pit systems, and methods may "comprise," "consists of," or "consist essentially of" any of the above-described components or steps of the fire pit systems, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a fire pit system and/or method that "comprises" a list of elements (e.g., components or steps) is not necessarily limited to only those elements (or components or steps), but may include other elements (or components or steps) not expressly listed or inherent to the fire pit system and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a protective fire pit system and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described fire pit systems and/or methods may comprise, consist essentially of, or consist of any of the herein-described components and features, as shown in the figures with or without any feature(s) not shown in the figures. In other words, in some embodiments, the fire pit systems and/or methods of the present invention do not have any additional features other than those shown in the figures, and such additional features, not shown in the figures, are specifically excluded from the fire pit systems and/or methods. In other embodiments, the fire pit systems and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Fire pit systems and kits, similar to exemplary fire pit system 100 and exemplary kit 200 shown in FIGS. 1-21B, were prepared.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A fire pit system comprising:
   a base pan comprising:
      a bottom surface;
      at least first side wall extending upward from the bottom surface along an outer periphery of the bottom surface;
      a first base pan connector coupled to the side wall; and
      a second base pan connector coupled to the side wall;
   a first rod member removably securable to the first base pan connector and a second rod member removably securable to the second base pan connector; and
   a ring member comprising:
      a ring base having a ring outer periphery;
      at least two ring connectors on opposite sides of the ring outer periphery;
      a first cylindrical tube coupled to a first of the at least two ring connectors, the first cylindrical tube configured to fit around the first rod member; and
      a second cylindrical tube coupled to a second of the at least two ring connectors, the second cylindrical tube configured to fit around the second rod member,
      wherein the first and second cylindrical tubes are configured to fit around the first or second rod member such that the ring connectors suspends the ring member over the base pan substantially perpendicular to the rod member when the first and second cylindrical tubes are coupled around the first and second rod members,
      wherein each of the first and second cylindrical tubes have a length greater than a thickness of the ring connectors, and
      wherein the ring connectors are positioned on each of the first and second cylindrical tubes substantially at the midpoint of the length of the first and second cylindrical tubes; and
      a third cylindrical tube associated with an additional accessory positioned and stacked on the first or second cylindrical tube along the first or second rod member.

2. The fire pit system of claim 1, wherein the additional accessory comprises a grill.

3. The fire pit system of claim 1, wherein the additional accessory comprises a griddle, wherein the additional accessory further includes an accessory support structure having a region configured to accept at least a portion of the griddle being nested therein.

4. The fire pit system of claim 1, further comprising:
   three or more leg connectors positioned along a lower surface of the base pan proximate the outer periphery;
   three or more pan legs having an upper portion respectively positioned inside of one of the three or more leg connectors and extending downward therefrom, each of the three or more pan legs being attachable and detachable from the three or more leg connectors; and
   three or more pan leg foot pads respectively positioned at an end portion of one of said three or more pan legs opposite said three or more leg connectors.

5. The fire pit system of claim 1, wherein the first base pan connector comprises a base pan cylindrical tube having at least one opening configured to enable the end portion of the first rod member to pass into the base pan cylindrical tube.

6. The fire pit of claim 1, wherein the first cylindrical tube is secured in place on the first rod member by an attachment member actuated into a holding position,
   wherein, when the attachment member is released from the holding position, the first cylindrical tube is free to move up, down, and off of the first rod member so as to reposition or remove the ring member from the fire pit system.

7. A fire pit system comprising:
   a base pan;
   first and second rod members;
   a first rod connector coupled to the base pan and including a first rod receiving region, wherein the first rod receiving region receives the first rod member such that the first rod member extends upward from the base pan;
   a second rod connector coupled to the base pan and including a second rod receiving region, wherein the second rod receiving region receives the second rod member such that the second rod member extends upward from the base pan;
   a griddle accessory;
   a griddle holder accessory including a first cylindrical tube coupler positioned around the first rod member and a first support structure coupled to the first cylindrical tube coupler, wherein the first support structure defines a region in which the griddle accessory is removably nested, wherein the first cylindrical tube coupler is configured to fit around the first rod member such that the first support structure suspends the griddle accessory over the base pan substantially perpendicular to the first rod member when the first cylindrical tube coupler is coupled around the first rod member, and wherein the first cylindrical tube has a length greater than a thickness of the first support structure, wherein the first support structure is positioned on the first cylindrical tube substantially at the midpoint of the length of the first cylindrical tube;
   a grill accessory defining a grill surface and including a second cylindrical tube coupler positioned around the first or second rod member and a second support structure coupled to the second cylindrical tube coupler, wherein the second cylindrical tube coupler is configured to fit around the first or second rod member such that the grill accessory suspends the grill accessory over the base pan substantially perpendicular to the first or second rod member when the second cylindrical tube coupler is coupled around the first or second rod member, and wherein the second cylindrical tube has a length greater than a thickness of the second support structure, wherein the second support structure is positioned on the second cylindrical tube substantially at the midpoint of the length of the second cylindrical tube, wherein the second cylindrical tube of the grill accessory is positioned and stacked on the first cylindrical tube along the rod member; and a ring member comprising:
  a ring base having a ring outer periphery:
  at least two ring connectors on opposite sides of the ring outer periphery;
  a third cylindrical tube coupled to a first of the at least two ring connectors, the third cylindrical tube configured to fit around the first rod member; and
  a fourth cylindrical tube coupled to a second of the at least two ring connectors, the fourth cylindrical tube configured to fit around the second rod member,
  wherein the third and fourth cylindrical tubes are configured to fit around the first or second rod member such that the ring connectors suspends the ring member over the base pan substantially perpendicular to the rod member when the third and fourth cylindrical tubes are coupled around the first and second rod members, wherein each of the third and fourth cylindrical tubes have a length greater than a thickness of the ring connectors, and wherein the ring connectors are positioned on each of the third and fourth cylindrical tubes substantially at the midpoint of the length of the third and fourth cylindrical tubes.

8. The fire pit system of claim 7 wherein the first rod receiving region is defined by a first opening and a first internal diameter that is larger than the respective outer diameter of the first rod member, wherein the first rod receiving region receives a respective end portion of the first rod member such that the first rod connector surrounds the respective end portion of the first rod member, and wherein the second rod receiving region is defined by a second opening and a second internal diameter that is larger than the respective outer diameter of the second rod member, wherein the second rod receiving region receives a respective end portion of the second rod member such that the second rod connector surrounds the respective end portion of the second rod member.

9. The fire pit system of claim 7 further comprising:
a first rod stop member that releasably couples the first rod member within the first rod receiving region; and
a second rod stop member that releasably couples the second rod member within the second rod receiving region.

10. The fire pit system of claim 7 further comprising:
four leg connectors rigidly coupled to an underside of the base pan;
four legs each having a respective upper portion positioned inside and surrounded by a respective one of the four leg connectors and extending downward therefrom and a respective end portion opposite the upper portion having a respective foot pad coupled thereto; and
four leg stop members that releasably couple the respective upper portions of the four legs within the respective ones of the four leg connectors.

11. The fire pit system of claim 7 further comprising a griddle attachment member that releasably couples the first cylindrical tube coupler to the first rod member when the griddle attachment member is actuated into a first holding position, wherein when the griddle attachment member is released from the first holding position, the first cylindrical tube coupler is free to move up, down, and off of the first rod member so as to reposition and remove the griddle holder accessory from the fire pit system.

12. The fire pit system of claim 7 further comprising a grill attachment member that releasably couples the second cylindrical tube coupler to the first or second rod member when the grill attachment member is actuated into a second holding position, wherein when the grill attachment member is released from the second holding position, the second cylindrical tube coupler is free to move up, down, and off of the first or second rod member so as to reposition and remove the grill accessory form the fire pit system.

* * * * *